(12) United States Patent
Borden et al.

(10) Patent No.: US 9,678,967 B2
(45) Date of Patent: Jun. 13, 2017

(54) INFORMATION SOURCE AGENT SYSTEMS AND METHODS FOR DISTRIBUTED DATA STORAGE AND MANAGEMENT USING CONTENT SIGNATURES

(75) Inventors: Bruce Borden, Los Altos, CA (US); Russell Brand, Redwood City, CA (US)

(73) Assignee: Callahan Cellular L.L.C., Wilmington, DE (US)

( * ) Notice: Subject to any disclaimer, the term of this patent is extended or adjusted under 35 U.S.C. 154(b) by 1058 days.

(21) Appl. No.: 11/783,271

(22) Filed: Apr. 6, 2007

(65) Prior Publication Data

US 2007/0260643 A1 Nov. 8, 2007

Related U.S. Application Data

(63) Continuation-in-part of application No. 10/443,006, filed on May 22, 2003, now Pat. No. 7,203,711.
(Continued)

(51) Int. Cl.
*G06F 17/30* (2006.01)
*H04L 29/06* (2006.01)
(Continued)

(52) U.S. Cl.
CPC .. *G06F 17/30117* (2013.01); *G06F 17/30097* (2013.01); *G06F 17/30162* (2013.01);
(Continued)

(58) Field of Classification Search
CPC .......... G06F 17/30117; G06F 17/3023; G06F 21/10; H04L 63/0428
(Continued)

(56) References Cited

U.S. PATENT DOCUMENTS 4,215,407 A * 7/1980 Gomola et al. ................. 700/95
5,499,294 A 3/1996 Friedman
(Continued)

OTHER PUBLICATIONS

Non-Final Rejection mailed Jun. 13, 2006 for U.S. Appl. No. 10/443,006, filed May 22, 2003; 12 pages.
(Continued)

*Primary Examiner* — Hadi Armouche
*Assistant Examiner* — Shahriar Zarrineh
(74) *Attorney, Agent, or Firm* — Sterne, Kessler, Goldstein & Fox P.L.L.C.

(57) ABSTRACT

Information source agent systems and methods for distributed content storage and management using content signatures that use file identicality properties are provided. A data management system is provided that includes a content engine for managing the storage of file content, a content signature generator that generates a unique content signature for a file processed by the content engine, a content signature comparator that compares content signatures and a content signature repository that stores content signatures. Information source agents are provided that include content signature generators and content signature comparators. Methods are provided for the efficient management of files using content signatures that take advantage of file identicality properties. Content signature application modules and registries exist within information source clients and centralized servers to support the content signature methods.

9 Claims, 34 Drawing Sheets

Related U.S. Application Data

(60) Provisional application No. 60/857,188, filed on Nov. 7, 2006.

(51) Int. Cl.
    *G06F 21/10* (2013.01)
    *G06F 11/14* (2006.01)

(52) U.S. Cl.
    CPC .. *G06F 17/30194* (2013.01); *G06F 17/30286* (2013.01); *G06F 11/1458* (2013.01); *G06F 17/3023* (2013.01); *G06F 21/10* (2013.01); *H04L 63/0428* (2013.01)

(58) Field of Classification Search
    USPC .......... 726/30; 707/662–664, 692, 697–699, 707/747, 201; 705/51
    See application file for complete search history.

(56) References Cited

U.S. PATENT DOCUMENTS

| | | | |
|---|---|---|---|
| 5,537,540 | A | 7/1996 | Miller et al. |
| 5,579,478 | A | 11/1996 | Heiserman et al. |
| 5,581,749 | A | 12/1996 | Hossain et al. |
| 5,590,318 | A | 12/1996 | Zbikowski et al. |
| 5,765,173 | A | 6/1998 | Cane et al. |
| 5,813,009 | A | 9/1998 | Johnson et al. |
| 5,893,910 | A | 4/1999 | Martineau et al. |
| 5,898,836 | A * | 4/1999 | Freivald ............ G06F 17/3089 707/E17.116 |
| 5,930,357 | A | 7/1999 | Fukui |
| 5,966,730 | A | 10/1999 | Zulch |
| 6,002,785 | A | 12/1999 | Ucida |
| 6,038,665 | A | 3/2000 | Bolt et al. |
| 6,076,108 | A * | 6/2000 | Courts et al. ................ 709/227 |
| 6,192,376 | B1 | 2/2001 | Kincaid et al. |
| 6,226,618 | B1 | 5/2001 | Downs et al. |
| 6,327,608 | B1 * | 12/2001 | Dillingham .................... 709/203 |
| 6,367,012 | B1 | 4/2002 | Atkinson et al. |
| 6,374,353 | B1 | 4/2002 | Settsu et al. |
| 6,378,031 | B1 * | 4/2002 | Kuno et al. ...................... 711/4 |
| 6,401,210 | B1 | 6/2002 | Templeton |
| 6,430,608 | B1 * | 8/2002 | Shaio ........................... 709/217 |
| 6,434,320 | B1 | 8/2002 | Orth et al. |
| 6,449,695 | B1 * | 9/2002 | Bereznyi et al. ............. 711/134 |
| 6,487,662 | B1 | 11/2002 | Kharon et al. |
| 6,516,337 | B1 | 2/2003 | Tripp et al. |
| 6,526,418 | B1 | 2/2003 | Midgley et al. |
| 6,560,615 | B1 | 5/2003 | Zayas et al. |
| 6,574,657 | B1 | 6/2003 | Dickinson |
| 6,697,948 | B1 | 2/2004 | Rabin et al. |
| 6,704,118 | B1 | 3/2004 | Hull et al. |
| 6,775,665 | B1 * | 8/2004 | Piersol .............. G06F 17/30017 |
| 6,802,004 | B1 * | 10/2004 | Gross ..................... G06F 21/10 713/161 |
| 6,847,982 | B2 | 1/2005 | Parker et al. |
| 6,882,344 | B1 * | 4/2005 | Hayes et al. .................. 345/467 |
| 6,922,781 | B1 * | 7/2005 | Shuster ........................ 713/165 |
| 6,993,591 | B1 | 1/2006 | Klemm |
| 7,035,468 | B2 | 4/2006 | Yogeshwar et al. |
| 7,054,867 | B2 * | 5/2006 | Bosley et al. |
| 7,203,711 | B2 | 4/2007 | Borden et al. |
| 7,263,721 | B2 * | 8/2007 | Kelley et al. ................... 726/23 |
| 7,287,046 | B2 * | 10/2007 | Bulka et al. |
| 7,320,009 | B1 * | 1/2008 | Srivastava ........ G06F 17/30215 707/625 |
| 7,363,277 | B1 | 4/2008 | Dutta et al. |
| 7,379,940 | B1 | 5/2008 | Baron |
| 7,496,604 | B2 | 2/2009 | Sutton, Jr. et al. |
| 7,552,220 | B2 | 6/2009 | Marmigere et al. |
| 7,624,135 | B2 * | 11/2009 | Shoji et al. |
| 7,921,300 | B2 | 4/2011 | Crispin et al. |
| 7,941,386 | B2 | 5/2011 | Bousquet et al. |
| 8,087,084 | B1 | 12/2011 | Andruss et al. |
| 8,364,965 | B2 | 1/2013 | Farrugia et al. |
| 8,392,705 | B2 | 3/2013 | Borden et al. |
| 8,646,038 | B2 | 2/2014 | Blumfield et al. |
| 2001/0041989 | A1 * | 11/2001 | Vilcauskas et al. ............. 705/1 |
| 2001/0056425 | A1 * | 12/2001 | Richard .............. G06F 11/1461 |
| 2002/0001395 | A1 * | 1/2002 | Davis ..................... G06F 21/10 382/100 |
| 2002/0038296 | A1 * | 3/2002 | Margolus .......... G06F 17/30097 |
| 2002/0059189 | A1 | 5/2002 | Hanes et al. |
| 2002/0083053 | A1 * | 6/2002 | Richard ............ G06F 17/30011 |
| 2002/0126872 | A1 | 9/2002 | Brunk et al. |
| 2002/0184333 | A1 * | 12/2002 | Appelman .............. H04L 29/06 709/217 |
| 2002/0188614 | A1 * | 12/2002 | King ............................. 707/100 |
| 2002/0198703 | A1 | 12/2002 | Lydecker et al. |
| 2002/0199119 | A1 * | 12/2002 | Dunnion ................ H04L 12/58 726/4 |
| 2003/0009365 | A1 * | 1/2003 | Tynan et al. ....................... 705/9 |
| 2003/0028736 | A1 | 2/2003 | Berkowitz et al. |
| 2003/0028761 | A1 * | 2/2003 | Platt ............................. 713/150 |
| 2003/0041094 | A1 | 2/2003 | Lara et al. |
| 2003/0050974 | A1 * | 3/2003 | Mani-Meitav .......... H04L 67/42 709/203 |
| 2003/0105716 | A1 * | 6/2003 | Sutton et al. .................... 705/50 |
| 2003/0120940 | A1 * | 6/2003 | Vataja ..................... G06F 21/10 713/193 |
| 2003/0145200 | A1 | 7/2003 | Eden |
| 2003/0195974 | A1 | 10/2003 | Ronning et al. |
| 2003/0236933 | A1 | 12/2003 | Shigeta et al. |
| 2004/0001104 | A1 | 1/2004 | Sommerer et al. |
| 2004/0054779 | A1 * | 3/2004 | Takeshima ........ G06F 17/30569 709/225 |
| 2004/0125993 | A1 | 7/2004 | Zhao et al. |
| 2004/0175058 | A1 | 9/2004 | Jojic et al. |
| 2004/0177319 | A1 | 9/2004 | Horn |
| 2004/0221118 | A1 | 11/2004 | Slater et al. |
| 2004/0236801 | A1 | 11/2004 | Borden et al. |
| 2004/0264734 | A1 | 12/2004 | Wakao |
| 2005/0102312 | A1 * | 5/2005 | Ohya et al. .................... 707/102 |
| 2005/0120025 | A1 * | 6/2005 | Rodriguez ........ G06F 17/30073 |
| 2005/0188048 | A1 | 8/2005 | Yuan et al. |
| 2005/0210009 | A1 | 9/2005 | Tran |
| 2005/0216757 | A1 * | 9/2005 | Gardner ........................ 713/194 |
| 2005/0262033 | A1 | 11/2005 | Yamashita |
| 2005/0289394 | A1 | 12/2005 | Arrouye et al. |
| 2007/0016951 | A1 | 1/2007 | Piccard et al. |
| 2007/0061308 | A1 | 3/2007 | Hartwell et al. |
| 2007/0276823 | A1 | 11/2007 | Borden et al. |
| 2007/0283078 | A1 | 12/2007 | Li et al. |
| 2008/0155192 | A1 | 6/2008 | Iitsuka |
| 2008/0270373 | A1 | 10/2008 | Oostveen et al. |
| 2010/0180128 | A1 | 7/2010 | Borden et al. |
| 2012/0011102 | A1 | 1/2012 | Borden et al. |
| 2012/0016843 | A1 | 1/2012 | Borden et al. |
| 2012/0016850 | A1 | 1/2012 | Borden et al. |
| 2012/0117665 | A1 | 5/2012 | Borden et al. |
| 2012/0131001 | A1 | 5/2012 | Borden et al. |
| 2012/0158760 | A1 | 6/2012 | Borden et al. |
| 2012/0185445 | A1 | 7/2012 | Borden et al. |
| 2012/0185505 | A1 | 7/2012 | Borden et al. |

OTHER PUBLICATIONS

Notice of Allowance mailed Nov. 29, 2006, for U.S. Appl. No. 10/443,006, filed May 22, 2003; 9 pages.

Non-Final Rejection mailed Oct. 13, 2010 for U.S. Appl. No. 11/783,272, filed Apr. 6, 2007; 8 pages.

Final Rejection mailed May 18, 2011 for U.S. Appl. No. 11/783,272, filed Apr. 6, 2007; 12 pages.

Non-Final Rejection mailed Oct. 11, 2011 for U.S. Appl. No. 11/783,272, filed Apr. 6, 2007; 10 pages.

Non-Final Rejection mailed Jan. 18, 2012 for U.S. Appl. No. 12/730,741, filed Mar. 24, 2010; 9 pages.

Final Rejection mailed Jan. 30, 2012 for U.S. Appl. No. 11/783,272, filed Apr. 6, 2007; 11 pages.

Final Rejection mailed May 4, 2012 for U.S. Appl. No. 12/730,741, filed Mar. 24, 2010; 9 pages.

(56) References Cited

OTHER PUBLICATIONS

Notice of Allowance mailed Nov. 16, 2012 for U.S. Appl. No. 12/730,741, filed Mar. 24, 2010; 7 pages.
Notice of Allowance mailed Jan. 9, 2013 for U.S. Appl. No. 12/730,741, filed Mar. 24, 2010; 7 pages.
Non-Final Rejection mailed Mar. 11, 2013 for U.S. Appl. No. 13/238,793, filed Sep. 21, 2011; 10 pages.
Non-Final Rejection mailed Mar. 26, 2013 for U.S. Appl. No. 13/350,324, filed Jan. 13, 2012; 15 pages.
Non-Final Rejection mailed Mar. 28, 2013 for U.S. Appl. No. 13/432,869, filed Mar. 28, 2012; 15 pages.
Non-Final Rejection mailed Apr. 15, 2013 for U.S. Appl. No. 13/242,927, filed Sep. 23, 2011; 7 pages.
Non-Final Rejection mailed Apr. 30, 2013 for U.S. Appl. No. 13/243,099, filed Sep. 23, 2011; 9 pages.
Final Rejection mailed Jul. 16, 2013 for U.S. Appl. No. 13/350,324, filed Jan. 13, 2012; 12 pages.
Final Rejection mailed Jul. 25, 2013 for U.S. Appl. No. 13/432,869, filed Mar. 28, 2012; 15 pages.
Non-Final Rejection mailed Jul. 31, 2013 for U.S. Appl. No. 13/362,891, filed Jan. 31, 2012; 12 pages.
Final Rejection mailed Sep. 5, 2013 for U.S. Appl. No. 13/238,793, filed Sep. 21, 2011; 8 pages.
Final Rejection mailed Sep. 19, 2013 for U.S. Appl. No. 13/242,927, filed Sep. 23, 2011; 8 pages.
Final Rejection mailed Sep. 24, 2013 for U.S. Appl. No. 13/243,099, filed Sep. 23, 2011; 9 pages.
Restriction/Election Requirement mailed Oct. 28, 2013 for U.S. Appl. No. 13/404,900, filed Feb. 24, 2012; 6 pages.
Non-Final Rejection mailed Oct. 29, 2013 for U.S. Appl. No. 13/432,622, filed Mar. 28, 2012; 9 pages.
Final Rejection mailed Jan. 28, 2014 for U.S. Appl. No. 13/362,891, filed Jan. 31, 2012; 13 pages.
Non-Final Rejection mailed Jan. 6, 2014 for U.S. Appl. No. 13/404,900, filed Feb. 24, 2012; 10 pages.
Final Rejection mailed Feb. 12, 2014 for U.S. Appl. No. 13/432,622, filed Mar. 28, 2012; 9 pages.
Non-Final Rejection mailed Feb. 18, 2014 for U.S. Appl. No. 13/238,793, filed Sep. 21, 2011; 11 pages.
Notice of Allowance mailed Feb. 18, 2014 for U.S. Appl. No. 13/242,927, filed Sep. 23, 2011; 13 pages.
Non-Final Rejection mailed Mar. 19, 2014 for U.S. Appl. No. 13/350,324, filed Jan. 13, 2012; 11 pages.
Final Rejection mailed May 27, 2014 for U.S. Appl. No. 13/404,900, filed Feb. 24, 2012; 12 pages.
Notice of Allowance mailed Jun. 4, 2014 for U.S. Appl. No. 13/242,927, filed Sep. 23, 2011; 8 pages.
Final Rejection mailed Jul. 23, 2014 for U.S. Appl. No. 13/238,793, filed Sep. 21, 2011; 16 pages.
Corrected Notice of Allowance mailed Sep. 16, 2014 for U.S. Appl. No. 13/242,927, filed Sep. 23, 2011; 10 pages.
Final Rejection mailed Sep. 12, 2014 for U.S. Appl. No. 13/350,324, filed Jan. 13, 2012; 6 pages.
Non-Final Rejection mailed Dec. 22, 2014 for U.S. Appl. No. 13/238,793, filed Sep. 21, 2011; 18 pages.
Final Rejection mailed Apr. 14, 2015 for U.S. Appl. No. 13/243,099, filed Sep. 23, 2011; 15 pages.
Final Rejection mailed Jul. 7, 2015 for U.S. Appl. No. 13/238,793, filed Sep. 21, 2011; 20 pages.
Non-Final Rejection mailed Aug. 5, 2015 for U.S. Appl. No. 13/243,099, filed Sep. 23, 2011; 14 pages.

* cited by examiner

INFORMATION SOURCE AGENT SYSTEMS AND METHODS FOR DISTRIBUTED DATA STORAGE AND MANAGEMENT USING CONTENT SIGNATURES

CROSS REFERENCE TO RELATED APPLICATIONS

The present application is a continuation-in-part of U.S. patent application Ser. No. 10/443,006, (now U.S. Pat. No. 7,203,711), entitled Systems and Methods for Distributed Content Storage and Management, to Borden et. al., ("'006 patent application"), which is hereby expressly incorporated by reference herein in its entirety.

The present application also claims priority to U.S. provisional patent application Ser. No. 60/857,188, entitled Systems and Methods for Distributed Data Storage and Management Using Content Signatures, filed on Nov. 7, 2006 by Borden et. al., which is hereby expressly incorporated by reference in its entirety.

BACKGROUND OF THE INVENTION

Field of the Invention

The invention relates to distributed content storage and management, and more particularly, to content signatures for back-up and management of files located on electronic information sources.

Background of the Invention

Distributed content storage and management presents a significant challenge for all types of businesses—small and large, service and products-oriented, technical and non-technical. As the Information Age emerges, the need to be able to efficiently manage distributed content has increased, and will continue to increase. Distributed content refers to files that are distributed throughout electronic devices within an organization. For example, an organization may have a local area network with twenty desktop computers connected to the network. Each of the desktop computers will contain files—program files, data files, and other types of files. The business may also have users with personal digital assistants (PDAs) and/or laptops that contain files. These files collectively represent the distributed content of the organization.

Essentially, two disparate approaches to distributed content storage and management have emerged. One approach relates to backing-up files, principally for the purpose of being able to restore files if a network or computer crashes. Under the back-up approach, the focus is on preserving the data by copying data and getting the data "far away," from its original location, so that it can not be accidentally or maliciously destroyed or damaged. Generally, this has meant that back-up files are stored on tape or other forms of detached storage devices, preferably in a separate physical location from the original source of the file. Given the desire to keep the data safe or "far away," file organization is by file name or volume where the data is stored, and accessing or retrieving files stored in a back-up system is often slow or difficult—and in some cases, practically impossible. Furthermore, because the backed-up files are not regularly accessed or used, when a back-up system does fail, often no one will notice and data can potentially be lost.

The other approach to distributed content management relates to content management of files. The content management approach is focused on controlling the creation, access and modification of a limited set of pre-determined files or groups of files. For example, one approach to content management may involve crude indexing and recording information about user created document files, such as files created with Microsoft Word or Excel. Within current content management approaches, systems typically require a choice by a user to submit a file to the content management system. An explicit choice requirement by a user, such as this, limits the ability of a system to capture all appropriate files and makes it impossible for an organization to ensure that it has control and awareness of all electronic content within the organization.

Neither approach fully meets the growing need to effectively manage distributed content. In user environments where only a back-up system is in place, easy access to stored files is difficult and access to information about a specific file is often impossible. In user environments where only a content management system exists, many files are left unprotected (i.e., not backed-up) and the indexing and searching capabilities are limited. In user environments where a back-up system and a content management system are both used, cost inefficiencies are introduced through redundancies. Moreover, even when both a back-up system and a content management system as are in use today are in place, the ability to manage and control the electronic content of an organization remains limited.

Patent application '006 addressed these challenges, by disclosing a system to cost-effectively store and manage all forms of distributed content and provided efficient methods to store distributed content to reduce redundant and inefficient storage of backed-up files. Additionally, the '006 patent application disclosed efficient methods to gather data related to file content that will spawn further user applications made possible by the sophisticated indexing of the invention.

Another challenge arises that involves determining whether content stored is the same as other sets of stored content. For example, when content is placed into a content storage device, it is very difficult to determine if the content is the same as other sets of content in storage devices. This problem has been addressed in limited environments using checksums. For example, to determine that the bits in a PROM are not corrupt or tampered with, a checksum is calculated on the PROM's content and the result compared against the known checksum for the PROM. Determining that two files are identical is more complicated because there is little foreknowledge about which files might be identical.

In the past few years, the industry has accepted computer "backup" as a necessary part of computer management. Backup basically involves copying all content from "online" storage to some form of "offline" storage, such as tapes or writeable optical media. Since tape or optical disk mounting is a very slow process, even for an automated jukebox, it has always been preferable to collect all of the files for a particular system together on the same media to facilitate restore. That is, even if it were possible to know that a copy of a file was already stored on some media in the archives, it would be impractical to restore a system from tens or hundreds or even thousands of different tapes or optical disks.

Now that inexpensive disk storage is available, it is possible to rethink computer backup. Rather than move every "file" to offline media, simply copy it to disks in a "near-line" environment. This is becoming common, with devices, for example, from NETWORK APPLIANCES, EMC and others. In this environment it is desirable to recognize common file contents and to store such content only once. Knowing that a file has identical content to a file content that has already been saved has tremendous value.

However, because finding matching files is so expensive, there are very few operations in modern computing that depend on finding identical files.

Several companies, including for example, PERMABIT, ARCHIVAS, BAKBONE, COMMVAULT, ROCKSOFT, DATA DOMAIN, UNDOO TECHNOLOGIES and AVAMAR have attempted to address this challenge. They provide file systems or solutions that are based on recognizing either common blocks or common strings of bits to reduce storage space for files. That is, when a file is stored, any common blocks or chunks of data that are common with previously stored files are remembered with pointers. These types of file systems are good for files that are not completely identical (e.g., email, log files, database files, etc.), but they do not automatically recognize file identicality. If all the blocks of a new file match the same set of blocks of an existing file, the files are identical, but this recognition require additional processing and is not automatic. It is possible that the variable length matching algorithms can be used to match whole files, but this will be computationally very expensive.

There have also been a number of projects that attempt to archive large portions of the Internet such as, for example, the Internet Archive project. These projects are limited to archiving web content, as opposed to files generally. Furthermore, in storing the web content they do not use a unique identifier, such as a signature. Additionally they are not back-up systems or content management systems. Moreover, they are quite limited in their searching ability in that they are not searchable by content or content attributes, but rather only by file location and dates.

What are needed are systems and methods for distributed content storage and management that can effectively and efficiently identify files that have identical content.

SUMMARY OF THE INVENTION

The invention is directed to systems and methods for distributed content storage and management using content signatures that use file identicality properties. A data management system is provided that includes a content engine for managing the storage of file content, a content signature generator that generates a unique content signature for a file processed by the content engine, a content signature comparator that compares content signatures and a content signature repository that stores content signatures. Information source agents are provided that include content signature generators and content signature comparators. Methods are provided for the efficient management of files using content signatures that take advantage of file identicality properties. Content signature application modules and registries exist within information source clients and centralized servers to support the content signature methods.

Further embodiments, features, and advantages of the invention, as well as the structure and operation of the various embodiments of the invention are described in detail below with reference to accompanying drawings.

BRIEF DESCRIPTION OF THE FIGURES

The invention is described with reference to the accompanying drawings. In the drawings, like reference numbers indicate identical, or functionally or structurally similar elements. The drawing in which an element first appears is indicated by the left-most digit(s) in the corresponding reference number.

DETAILED DESCRIPTION OF THE INVENTION

While the invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
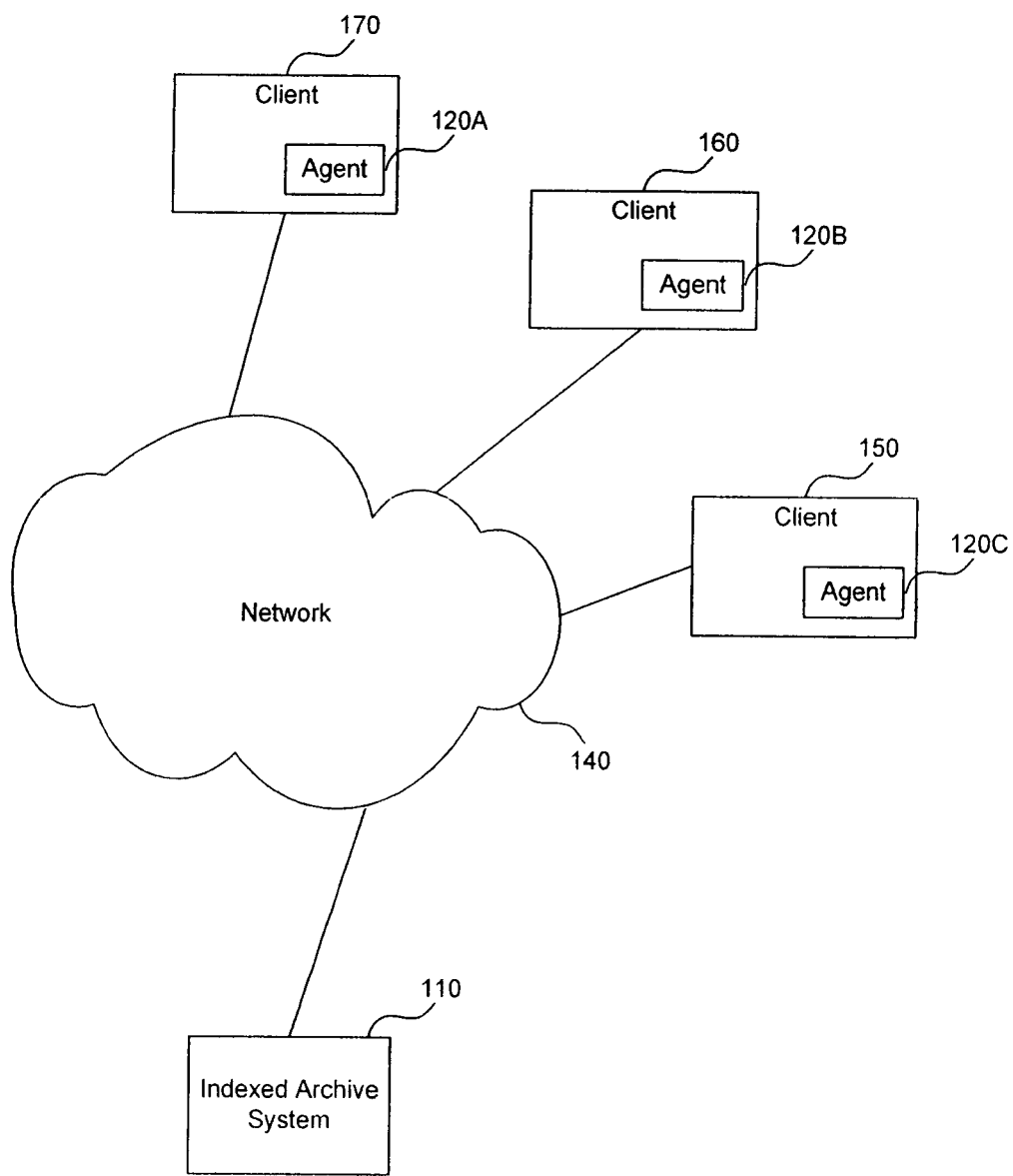
FIG. 1 is a diagram of a distributed content storage and management system, according to an embodiment of the invention.

FIG. 1 illustrates distributed storage and content management system 100, according to an embodiment of the invention. Distributed storage and content management system 100 includes information source clients 150, 160 and 170 coupled together through network 140. A local area network, a wide area network, or the Internet are examples of this arrangement of information source clients and network. Furthermore, network 140 could be a combination of networks, and the number of information source clients could range from one to more than tens of millions. Most commonly the invention will likely be implemented in networks containing from a few to thousands of information source clients. Network 140 can be a wireline or wireless network or a network with both wireline and wireless connections. Information source clients can be any type of device capable of storing files. Examples of information source clients include desktop computers, laptop computers, server computers, personal digital assistants, CDROMs, and printer ROMs. These information source clients may or may not be connected to a network.

The content management portions of distributed storage and content management system 100, include indexed archive system 110 and information source agents 120A, 120B and 120C. Information source agents 120A, 120B and 120C can be software modules, firmware or hardware installed within the information source clients 150, 160 and 170. Information source agents 120A, 120B, and 120C contain modules to communicate with indexed archive system 110 over network 140 or over another network not used for the purpose of networking the information source clients. The basic functions of information source agents 120A, 120B and 120C are to transfer files to the indexed archive system, to generate file information, and to manage files located on the information source client. In an alternative embodiment, information source clients may not all have information source agents. In this case, the information source agents would not be local to the information source client, but rather would be located elsewhere and would gather needed information remotely.

Indexed archive system 110 has four basic functions that include backing-up files stored on the information source clients 150, 160 and 170, storing file information, indexing file contents, and enabling searching of indexed file information. The file information can consist of the actual file, portions of a file, differences between the file and another file, content extracted from the file, metadata regarding the file, metadata indexes, content indexes and a unique file identifier.

As used herein, file is broadly defined to include any named or namable collection of data located on an electronic device. Examples of files include, but are not limited to, data files, application files, system files, and programmable ROM files. Metadata can consist of a wide variety of data that characterizes the particular file. Examples of metadata include, but are not limited to file attributes; such as the file name, the information source client or client(s) where the file was located; and the date and time of the back-up of the file. Additionally, metadata can include, but is not limited to other information, such as pointers to related versions of the file; a history of file activity, such as use, deletions and changes; and access privileges for the file.

Figure 2:
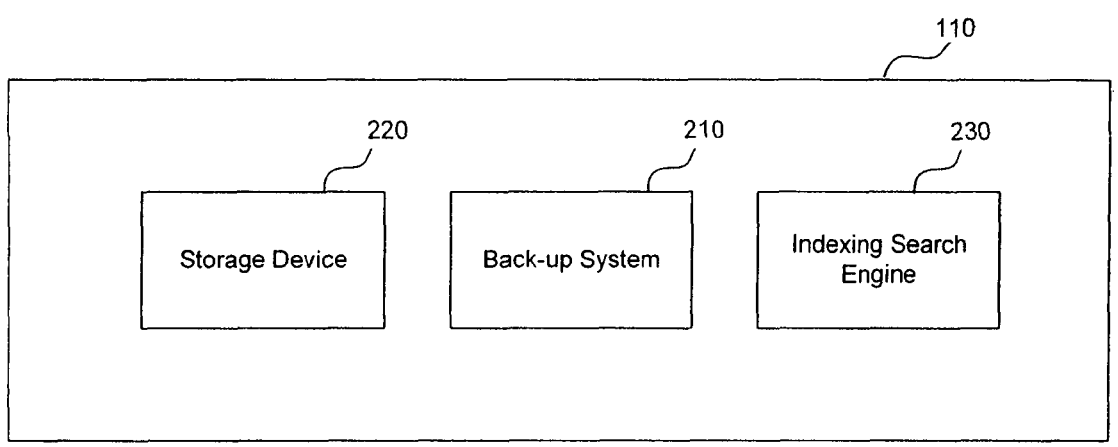
FIG. 2 is a diagram of an indexed archive system, according to an embodiment of the invention.

FIG. 2 depicts indexed archive system 110, according to an embodiment of the invention. Indexed archive system 110 includes back-up system 210, storage device 220, and indexing search engine 230. Back-up system 210 is coupled to storage device 220 and indexing search engine 230. Back-up system 210 includes capabilities to gather files from information source clients, provide file information to storage device 220 for storage and interface with indexing search engine 230 to index file information and retrieve file information based on the searching capabilities of indexing search engine 230.

Back-up system 210, storage device 220 and indexing search engine 230 can be implemented on a single device or multiple devices, such as one or more servers. Similarly, each of the components—back-up system 210, storage device 220 and indexing search engine 230—can be implemented on one or multiple devices. For example, storage device 220 can be implemented on multiple disk drives, multiple tape drives, memory sticks, floppies disks, CDs, DVDs, paper tape, paper cards, 2d bar cards, 3d bar cards (e.g., endicia), ROM's, network storage devices, flash memory or a combination of these. Similarly, indexing search engine 230 could be implemented on a desktop computer, a laptop computer, or a server computer or any combination thereof. Moreover, each of the components can be co-located or distributed remotely from one another.

Figure 3:
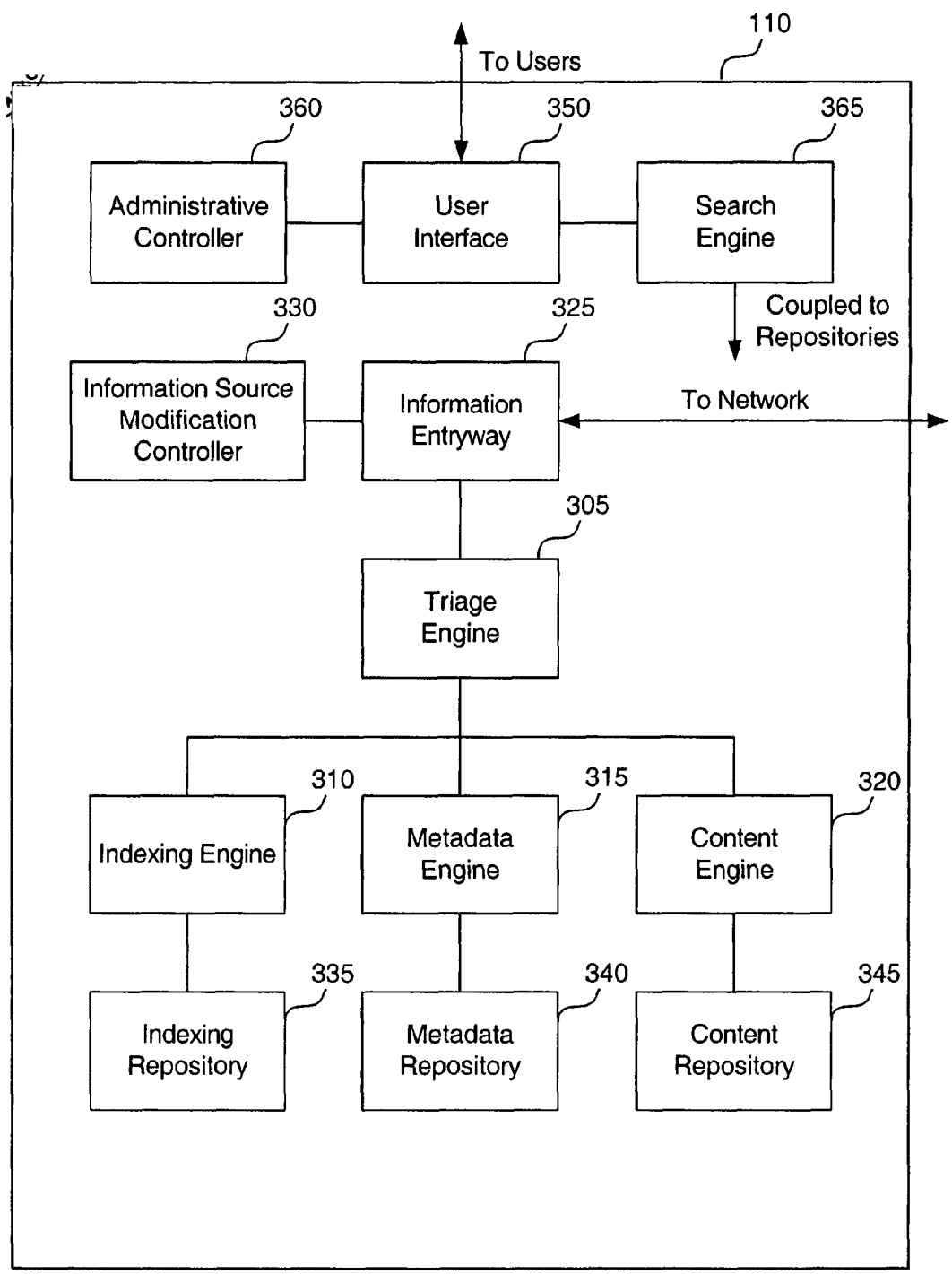
FIG. 3 is a diagram of an indexed archive system, according to an embodiment of the invention.

FIG. 3 depicts indexed archive system 110, according to another embodiment of the invention. FIG. 3 provides one embodiment for implementing the general embodiment described with reference to FIG. 2. Indexed archive system 110 includes a set of engines: triage engine 305, indexing engine 310, metadata engine 315 and content engine 320. Additionally, indexed archive system 110 includes a set of repositories: indexing repository 335, metadata repository 340, and content repository 345. Other elements of indexed archive system 110 are information entryway 325, information source modification controller 330, user interface 350 and search engine 365. Finally, indexed archive system 110 includes administrative controller 360 that provides overall administration and management of the elements of indexed archive system 110.

Information entryway 325 receives file information from a set of information source client agents, such as agents 120A, 120B, and 120C, over a network, such as network 140. Information entryway 325 can also receive other forms of information about information sources and network activity. Information entryway 325 makes received file information available to triage engine 305. Information entryway 325 also transmits control messages to information source client agents. Information entryway 325 is coupled to triage engine 305 and information source modification controller 330.

Information source modification controller 330 can send requests through the information entryway 325 to information source agents to modify files located on the information source clients or to request that an information source agent transmit file information to information entryway 325.

In addition to being coupled to information entryway 325, triage engine 305 is coupled to indexing engine 310, metadata engine 315 and content engine 320. Triage engine 305 monitors information that has arrived at information entryway 325. Triage engine 305 informs index engine 310 what new content and/or metadata needs to be indexed. Similarly, triage engine 305 informs metadata engine 315 and content engine 320 what data needs to be processed and stored.

Indexing engine 310 is also coupled to indexing repository 335. Upon being notified by triage engine 305 that file information needs to be processed, indexing engine 310 will generate a content index for the file that was received. The index will then be stored in indexing repository 335. Indexing repository 335 will contain the searchable attributes of the file content and/or metadata along with references that identify the relationship of the file content or metadata to one or more primary identifiers. A primary identifier is a unique identifier for a file content.

Metadata engine 315 is also coupled to metadata repository 340. Upon being notified by triage engine 305 that file information needs to be processed, metadata engine 315 will generate or update metadata for the file that was received. Metadata engine 315 also generates a metadata index that can be used for searching capabilities. The metadata along with the relationship between the metadata, metadata index, and a primary identifier will then be stored in metadata repository 340.

Content engine 320 is also coupled to content repository 345. Upon being notified by triage engine 305 that file information needs to be processed, content engine 320 will store the file content that was received. The file content along with the relationship between the content data and a primary identifier will be stored in content repository 345.

User interface 350 enables users to control and access indexed archive system 110. User interface 350 can support general and administrative use. User interface 350 can include access privileges that allows users various control levels of indexed archive system 110. Access privileges can be set to allow administrative control of indexed archive system 110. Such control can allow an administrator to control all functions of the system, including changing basic operating parameters, setting access privileges, defining indexing and search functions, defining the frequency of file back-ups, and other functions typically associated with administrative control of a system. Additionally, access privileges can be set to enable general purpose use of indexed archive system 110, such as reviewing file names for files backed-up, and using search functions to find a particular file or files that meet search criteria.

Within user interface 350, a retrieval user interface can exist that facilitates the bulk restoring of an information source client or restoral of individual files. Similarly, within user interface 350, an indexing user interface can exist that enables a user to search for file information or content based on indexed criteria (content and/or metadata).

User interface 350 is coupled to administrative controller 360 and to search engine 365. Additionally user interface 350 can be coupled to an external terminal or to a network to allow remote user access to indexed archive system 110. A graphical user interface will typically be employed to enable efficient use of user interface 350.

Search engine 365 is coupled to user interface 350 and to indexing repository 335, metadata repository 340 and content repository 345. Search engine 365 enables a user to search the repositories for files and information about files. A search engine, such as that used by GOOGLE, can be employed within the system.

Administrative controller 360 is coupled to all elements within indexed archive system 110. Administrative controller 360 provides overall system management and control.

Each of the elements of indexed archive system 110 can be implemented in software, firmware, hardware or a combination thereof. Moreover, each of the elements can reside on one or more devices, such as server computers, desktop computers, or laptop computers. In one configuration, the repositories can be implemented on one or more storage devices such as, for example, multiple disk drive, multiple tape drives, memory sticks, floppies disks, CDs, DVDs, paper tape, paper cards, 2d bar cards, 3d bar cards (e.g., endicia), ROM's, network storage devices, flash memory or a combination of these. The other elements can be implemented within a server computer or multiple server computers.

Figure 4:
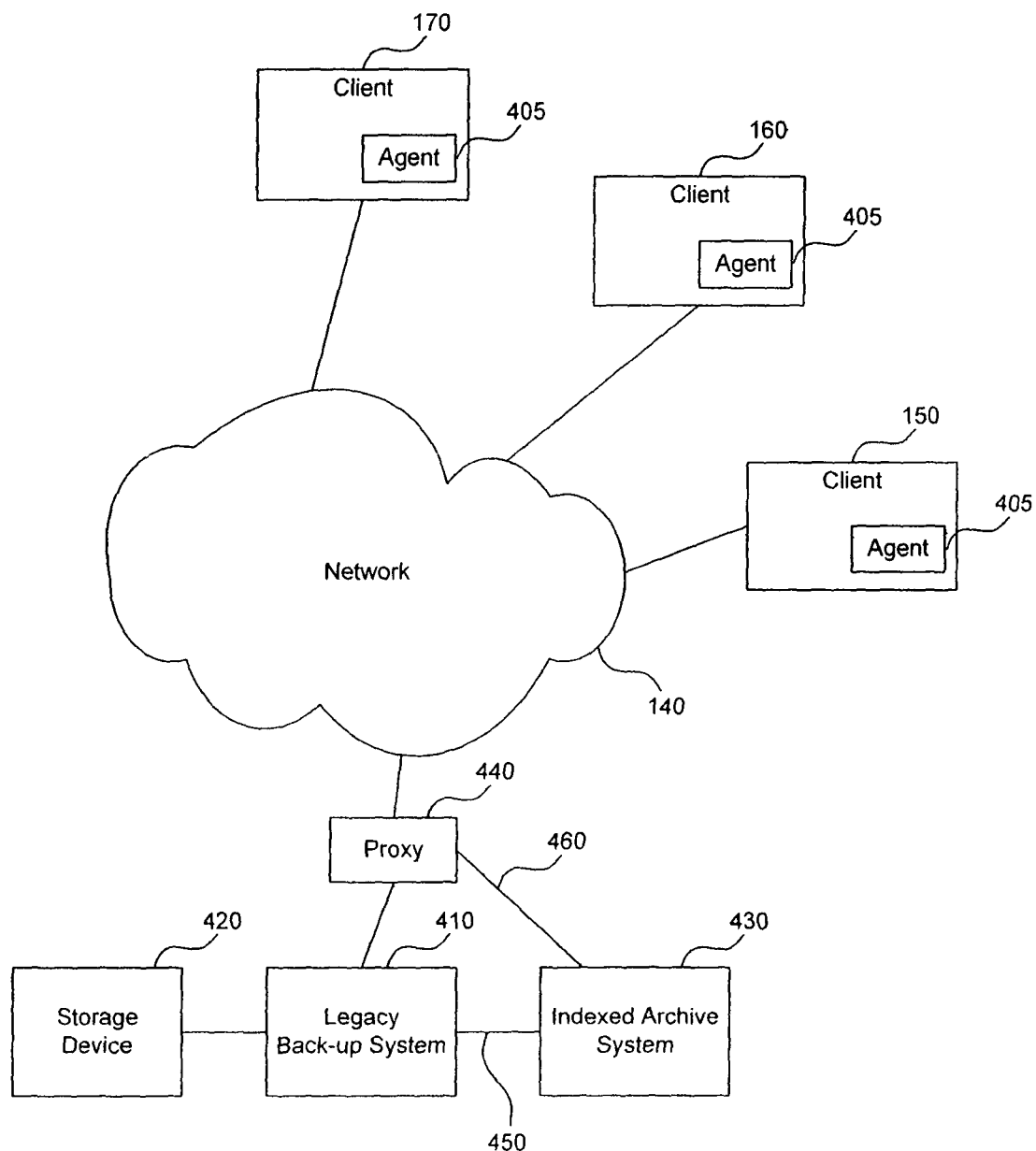
FIG. 4 is a diagram of a distributed content storage and management system integrated with a legacy back-up system, according to an embodiment of the invention.

FIG. 4 provides a diagram of distributed storage and content management system 400 integrated with a legacy back-up system, according to an embodiment of the invention. The difference between distributed storage and content management system 400 and distributed storage and content management system 100 is that within distributed storage and content management system 400 a legacy back-up system exists. Legacy back-up system refers to a file back-up system that currently exists. Example legacy back-up systems include Legato Networker 6 and Veritas storage management systems. Legacy back-up system also refers to any existing or future back-up system that backs-up files.

As shown in FIG. 4, indexed archive system 430 can be implemented to work with legacy back-up system 410 to reduce redundant activities and provide an easy integration of indexed archive system 430 with a customer's network that may already be using a legacy back-up system.

As in distributed storage and content management system 100, distributed storage and content management system 400 includes information source clients 150, 160 and 170 coupled together through network 140. The content management portions of distributed storage and content management system 400, include legacy back-up system 410, storage device 420, indexed archive system 430, proxy 440, and agents 405A, 405B and 405C. Information source agents 405A, 405B, 405C are located within the information source clients, and are agents associated with legacy back-up system 410 that facilitate the transfer of files.

Legacy back-up system 410 is coupled to storage device 420. Legacy back-up system 410 gathers files from information source clients, and backs-up files by storing the files on storage device 420. Proxy 440 resides between legacy back-up system 410 and network 140. Proxy 440 provides a passive interface that allows indexed archive system 430 to gather files or file information as files are collected by legacy back-up system 410. Indexed archive system 430 is coupled to proxy 440 over connection 460. Indexed archive system 430 can also be coupled to legacy-back up system 410 over connection 450. As discussed more thoroughly with respect to FIG. 5, indexed archive system 430 may or may not also store back-up copies of the files being backed up by legacy back-up system 410.

Indexed archive system 430 has four basic functions that include backing-up files stored on the information source clients 150, 160 and 170, storing file information, indexing file contents, and enabling searching of indexed file information. As discussed previously, depending on the amount of redundancy desired, indexed archive system 430 may or may not store entire files for back-up in this embodiment. If indexed archive system 430 does not store actual file back-ups, a pointer will be created identifying where the file is stored.

Figure 5:
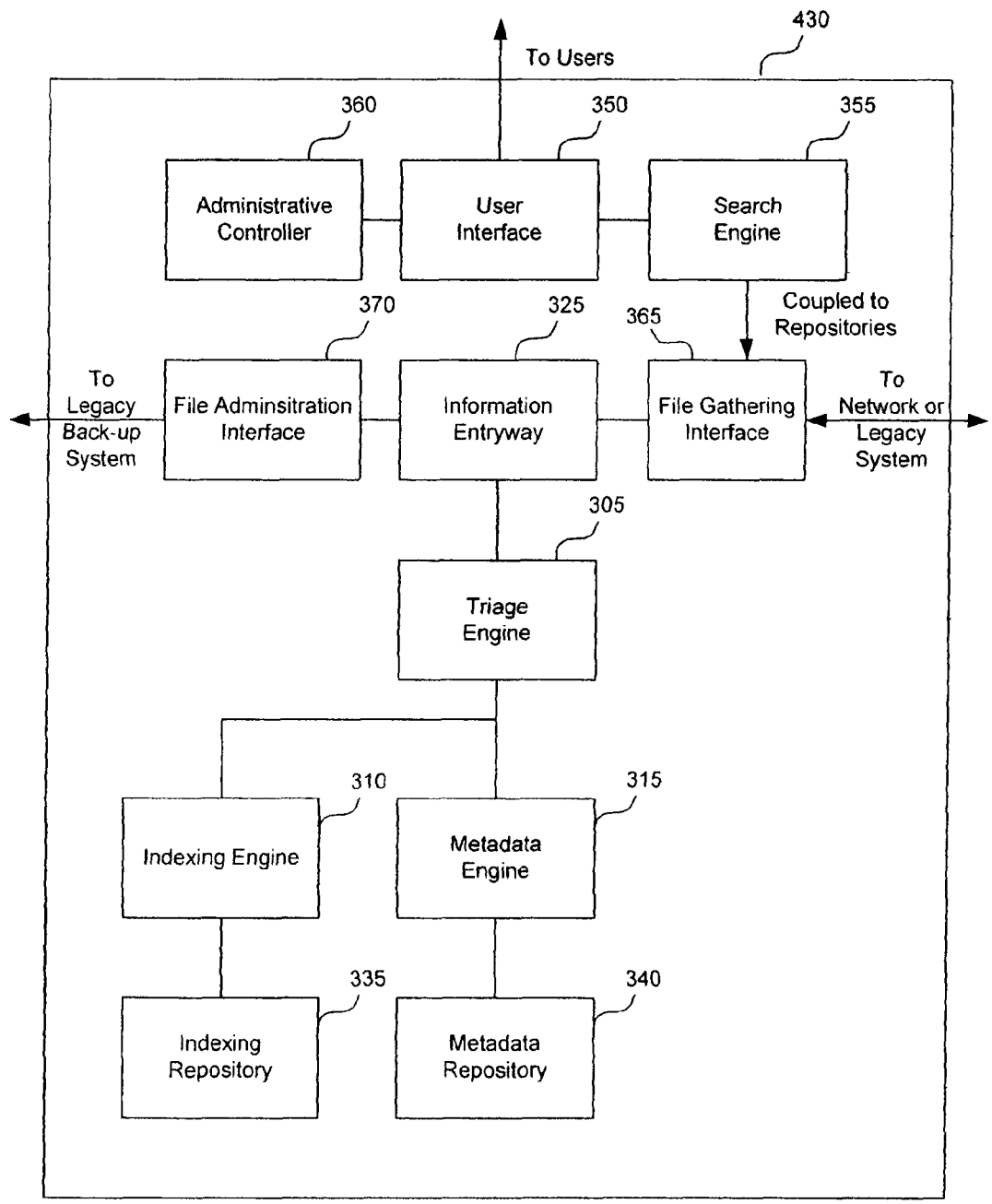
FIG. 5 is a diagram of an indexed archive system with interfaces to a legacy back-up system, according to an embodiment of the invention.

FIG. 5 is a diagram of indexed archive system 430, according to an embodiment of the invention. Indexed archive system 430 is similar to indexed archive system 110, except that it does not include a content engine or a content repository, and it does include file gathering interface 365 and file administration interface 370.

As in the case of indexed archive system 110, indexed archive system 430 includes triage engine 305, indexing engine 310 and metadata engine 315. Additionally, indexed archive system 430 includes indexing repository 335 and metadata repository 340. Other elements of indexed archive system 430 are information entryway 325, user interface 350 and search engine 365. Finally, indexed archive system 430 includes administrative controller 360 that provides overall administration and management of the elements of indexed archive system 430.

As mentioned above, indexed archive system 430 also includes file gathering interface 365. File gathering interface 365 enables indexed archive system 430 to gather files from a proxy, such as proxy 440, to obtain them directly from a legacy back-up system, such as legacy back-up system 450, or to obtain files through some other means, such as sniffing a network on which files are transferred to a back-up system. File gathering interface 365 is coupled to information entryway 325 and provides gathered files and file information to information entryway 325. Additionally, indexed archive system 430 includes file administration interface 370. File administration interface 370 provides coupling with a legacy back-up system for accessing files backed-up and exchanging administrative data with the legacy back-up system. In another embodiment, file administration interface 370 may not be included.

Information entryway 325 receives file information from file gathering interface 365. Information entryway 325 can also receive other forms of information about information sources and network activity. Information entryway 325 makes received file information available to triage engine 305.

In addition to being coupled to information entryway 325, triage engine 305 is coupled to indexing engine 310 and metadata engine 315. Triage engine 305 monitors information that has arrived at information entryway 325. Triage engine 305 informs index engine 310 what new content and/or metadata needs to be indexed. Similarly, triage engine 305 informs metadata engine 315 what data needs to be processed and stored.

Indexing engine 310 is also coupled to indexing repository 335. Upon being notified by triage engine 305 that file information needs to be processed, indexing engine 310 will generate a content index for the file that was received. The index will then be stored in indexing repository 335. Indexing repository 335 will contain the searchable attributes of the file content and/or metadata along with references that identify the relationship of the file content or metadata to one or more primary identifiers.

Metadata engine 315 is also coupled to metadata repository 340. Upon being notified by triage engine 305 that file information needs to be processed, metadata engine 315 will generate or update metadata for the file that was received. Metadata engine 315 will also generate a metadata index for the received file (or update an existing one). The metadata along with the relationship between the metadata and a primary identifier will then be stored in metadata repository 340.

In an alternate embodiment, where indexed archive system 430 is also backing up files, a content engine and a content repository can be included within indexed archive system. In this case, the content engine would be coupled to triage engine 305 and to the content repository. Upon being notified by triage engine 305 that file information needs to be processed, content engine 345 would store the file content that was received. The file content along with the relationship between the content data and a primary identifier will be stored in the content repository.

As in the case of indexed archive system 430, user interface 350 enables users to control and access indexed archive system 110. User interface 350 can support general use and administrative use. Within user interface 350, a retrieval user interface can exist that facilitates the bulk restoring of an information source client or restoral of individual files. Similarly, within user interface 350, an indexing user interface can exist that enables a user to search for file information or content based on indexed criteria (content and/or metadata).

User interface 350 is coupled to administrative controller 360 and to search engine 365. Additionally user interface 350 can be coupled to an external terminal or to a network to allow remote user access to indexed archive system 430. A graphical user interface will typically be employed to enable efficient use of user interface 350.

Search engine 365 is coupled to user interface 350 and to indexing repository 335 and metadata repository 340. Search engine 365 enables a user to search the repositories for files and information about files. A search engine, such as that used by GOOGLE, can be employed within the system.

Administrative controller 360 is coupled to all elements within indexed archive system 430. Administrative controller 360 provides overall system management and control.

Each of the elements of indexed archive system 430 can be implemented in software, firmware, hardware or a combination thereof. Moreover, each of the elements can reside on one or more devices, such as server computers, desktop computers, or laptop computers. In one configuration, the repositories can be implemented on one or more storage devices such as, for example, on disk drives, tape drives, memory sticks, floppies disks, CDs, DVDs, paper tape, paper cards, 2d bar cards, 3d bar cards (e.g., endicia), ROM's, network storage devices, flash memory or a combination of these. The other elements can be implemented within a server computer or multiple server computers.

Figure 6:
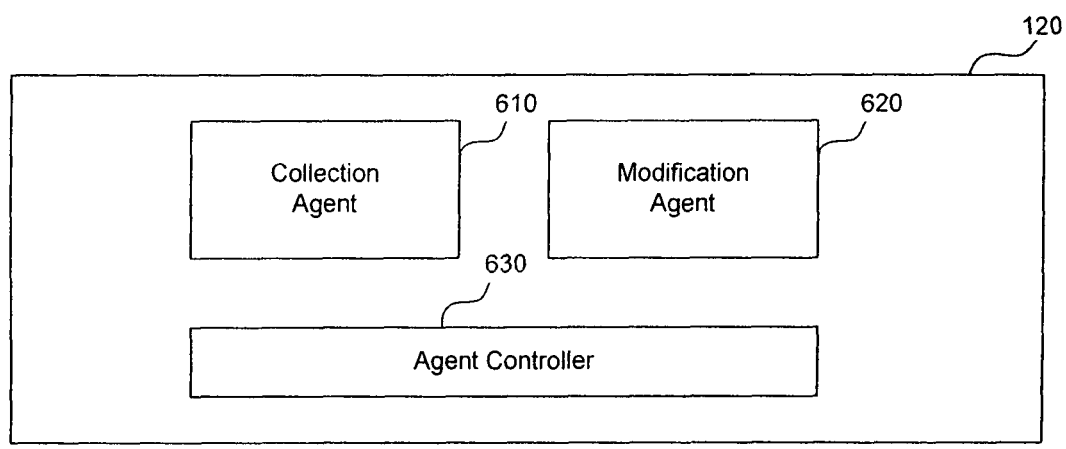
FIG. 6 is a diagram of an information source agent, according to an embodiment of the invention.

FIG. 6 is a diagram of information source agent 120, according to an embodiment of the invention. Information source agent 120 includes collection agent 610, modification agent 620 and agent controller 630. Collection agent 610 and modification agent 620 are coupled to agent controller 630. Collection agent 610 computes, gathers and/or transports file information and other data to an information entryway, such as information entryway 325. Modification agent 620 honors requests to make modifications to the information source, including, but not limited to deleting files, replacing outdated files with current files, replacing files with links or references (e.g., a symbolic link within the UNIX operating system or a short cut using the Windows WINDOWS operating system) to files located elsewhere, and marking the file in a manner visible to other programs. Security measures are included within information source agent to prevent unauthorized use, particularly with respect to modification agent 620. Agent controller 630 controls the overall activity of information source agent 120. In an alternative embodiment, information source agent 120 does not include modification agent 620.

Figure 7:
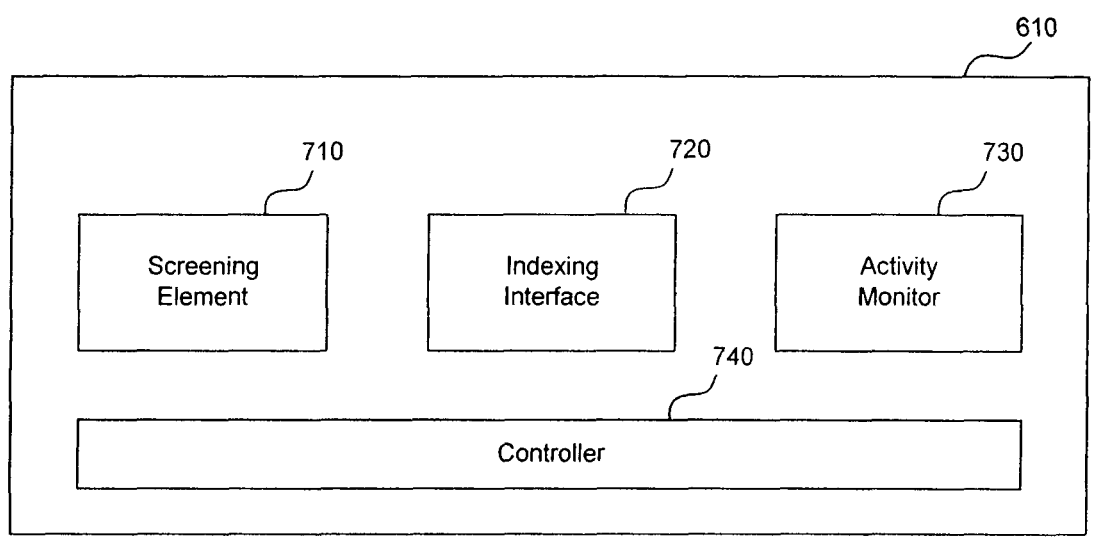
FIG. 7 is a diagram of an information source collection agent, according to an embodiment of the invention.

FIG. 7 is a diagram of an information source collection agent 610. Information source collection agent 610 includes screening element 710, indexing interface 720, activity monitor 730 and controller 740. Screening element 710, indexing interface 720, and activity monitor 730 are coupled to controller 740. Screening element 710 assesses whether a file should be transmitted to an indexed archive system, such as indexed archive system 110. Indexing interface 720 communicates with an indexing system, and can index files locally on the information source client. In an alternate embodiment, information source collection agent 610 does not include indexing interface 720. Activity monitor 730 gathers information about file activity, such as creation, usage, modification, renaming, persons using a file, and deletion. Activity monitor 730 can also gather information about intermediate content conditions of files between times when files are backed up.

Information source client agent 120 can be implemented in software, firmware, hardware or any combination thereof. Typically, information source client agent 120 will be implemented in software.

Figure 8:
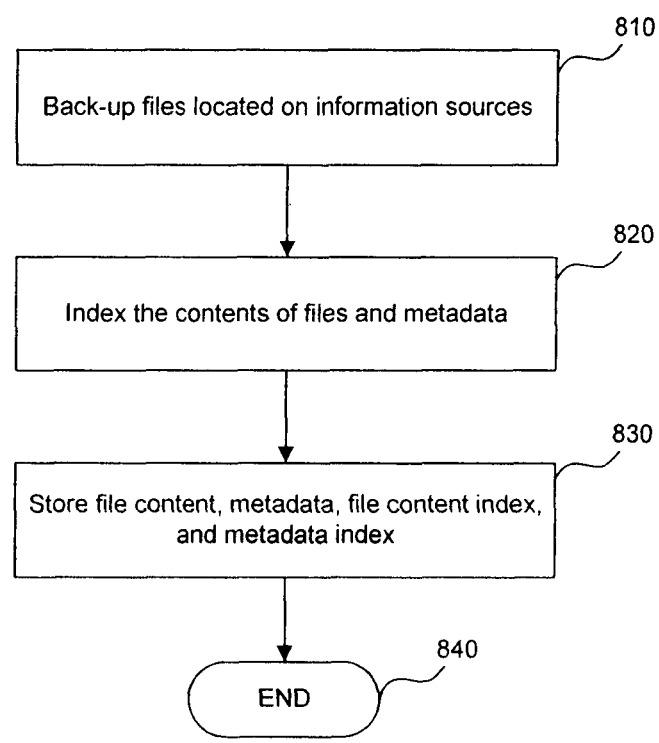
FIG. 8 is a flow chart of a method to store distributed content, according to an embodiment of the invention.

FIG. 8 provides a flow chart of method 800 to store distributed content, according to an embodiment of the invention. Method 800 begins in step 810. In step 810, files located on information source clients are backed-up. For example, in one embodiment indexed archive system 110 would back-up the files located on information source clients 150, 160, and 170. In step 820 metadata and file content are indexed. For example, in one embodiment indexed archive system 110 would generate metadata for files received from information source clients 150, 160, and 170. Indexed archive system 110 would then index the metadata and file content. In step 830, file content, metadata, metadata indexes, and content indexes are stored. For example, in one embodiment indexed archive system 110 would store the file content, metadata, and indexes for both. In step 840, method 800 ends.

Figure 9:
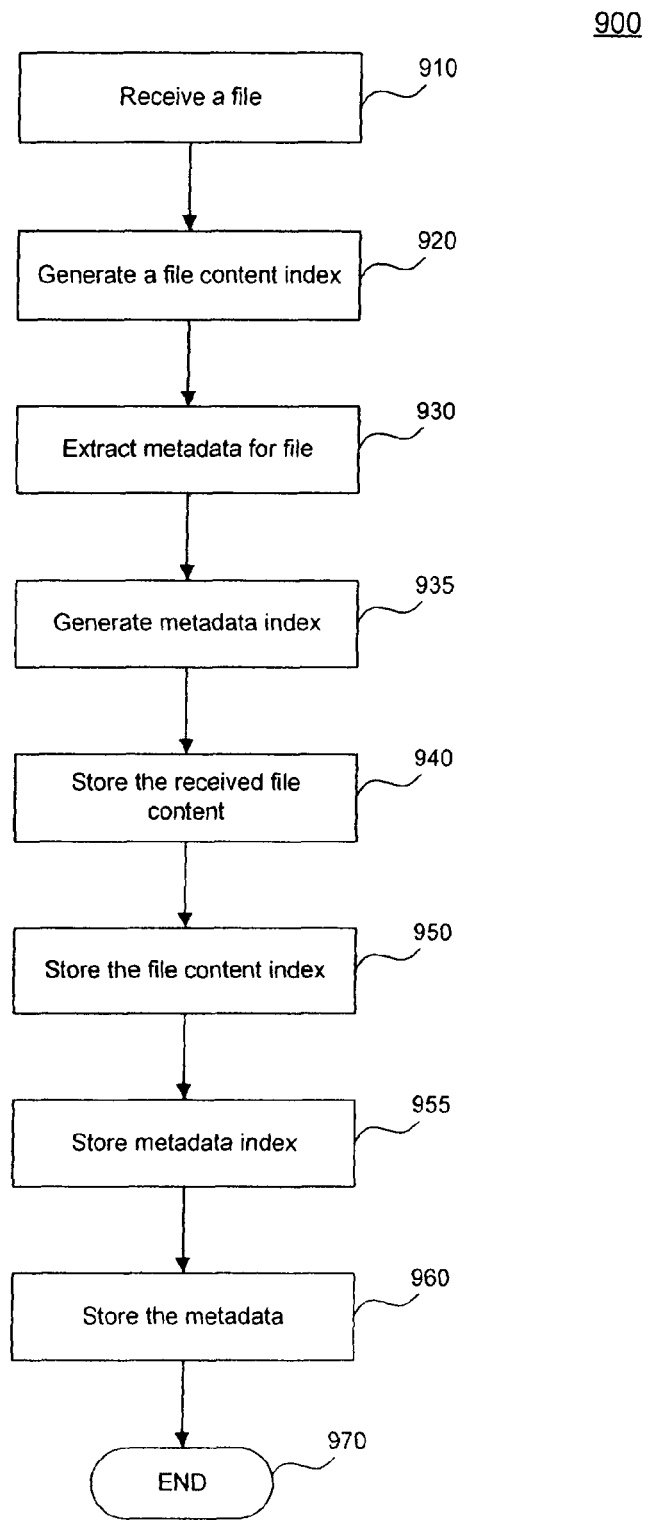
FIG. 9 is a flow chart of a method to store distributed content, according to an embodiment of the invention.

FIG. 9 provides a flow chart of method 900 to store distributed content, according to an embodiment of the invention. Method 900 begins in step 910. In step 910, a file is received. For example, indexed archive system 110 can receive a file from information source agent 120A. In step 920 a file content index is generated for the received file. For example, indexing engine 310 can generate a content index for a received file. In step 930, metadata for the received file is extracted. For example, metadata engine 315 can extract metadata from a received file. In step 935, a metadata index is generated. In one example, metadata engine 315 can generate a metadata index based on metadata extracted from a received file. In step 940, the received file is stored. For example, in one case content engine 320 could store the received file content in content repository 345. In step 950, the file content index is stored. For example, indexing engine 310 could store the file content index in index repository 335. In step 955, the metadata index is stored. In step 960, the metadata is stored. For example, metadata engine 315 can store both the metadata index and the metadata in metadata repository 340. In step 970, method 900 ends.

Figure 10:
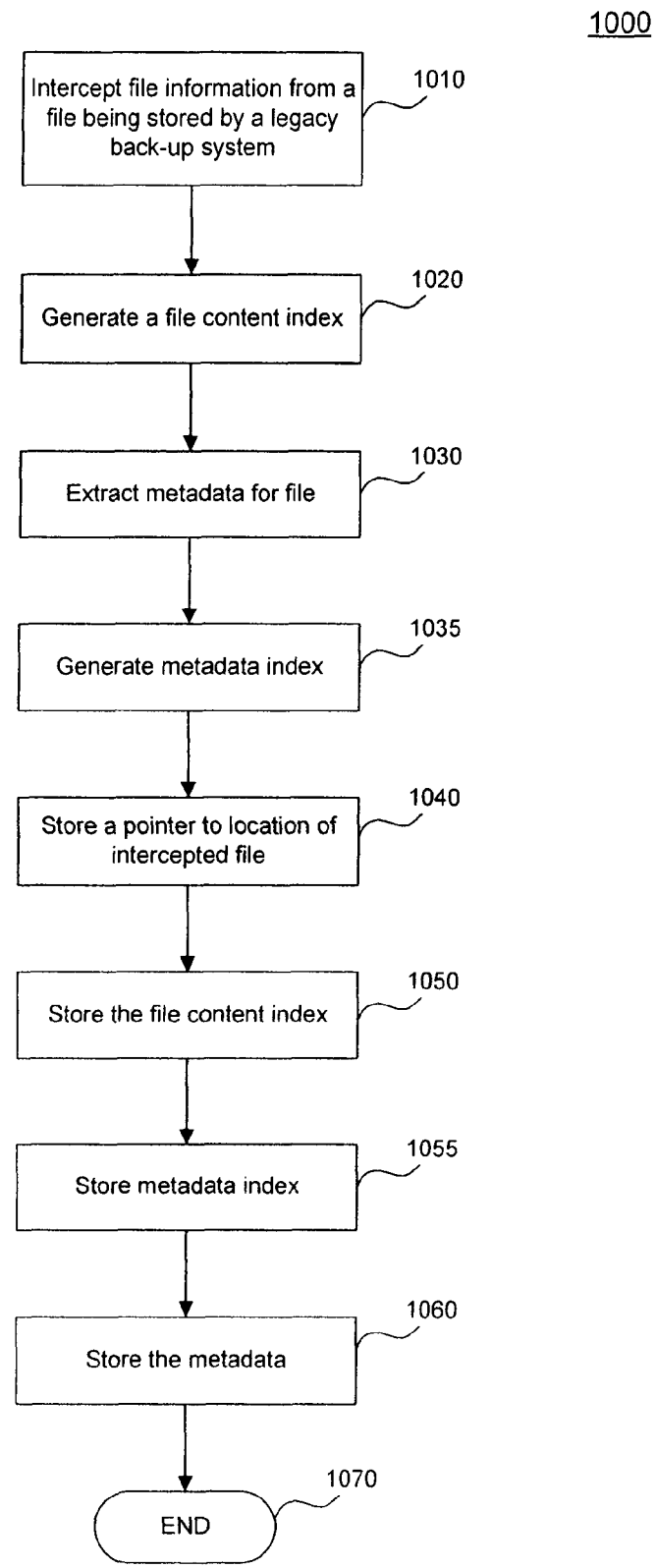
FIG. 10 is a flow chart of a method to store content information associated with files stored in a legacy back-up system, according to an embodiment of the invention.

FIG. 10 provides a flow chart of method 1000 to store content information associated with files stored in a legacy back-up system, according to an embodiment of the invention. Method 1000 begins in step 1010. In step 1010 file information from a file being stored by a legacy back-up system, such as legacy back-up system 410, is intercepted. In one example, the file information can be intercepted through the use of a proxy, such as proxy 440, in which a file gathering interface, such as file gathering interface 365 gathers the file information. In another example, a file gathering interface, such as file gathering interface 365, can employ a sniffing routine to monitor and gather information transmitted via a network to a legacy back-up system, such as legacy back-up system 410 to gather file information. The remaining steps are similar to the comparable steps in method 900, and can employ similar devices to perform the steps. In step 1020 a file content index is generated for the received file. In step 1030, metadata for the received file is extracted. In step 1035, a metadata index is generated. In step 1040, the received file is stored. In step 1050, the file content index is stored. In step 1055, the metadata index is stored. In step 1060, the metadata is stored. In step 1070, method 1000 ends.

Figure 11A:
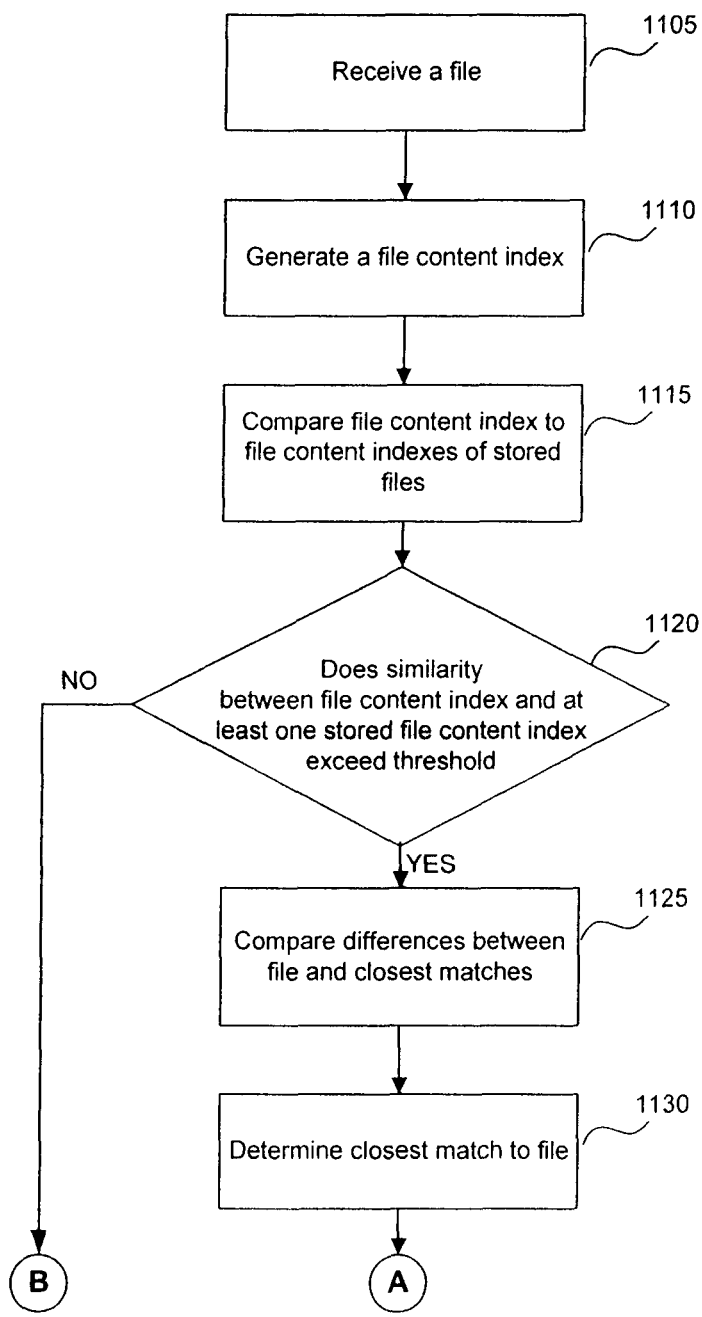
FIGS. 11A and 11B are flow charts of a method to store distributed content using a content similarity test, according to an embodiment of the invention.
Figure 11B:
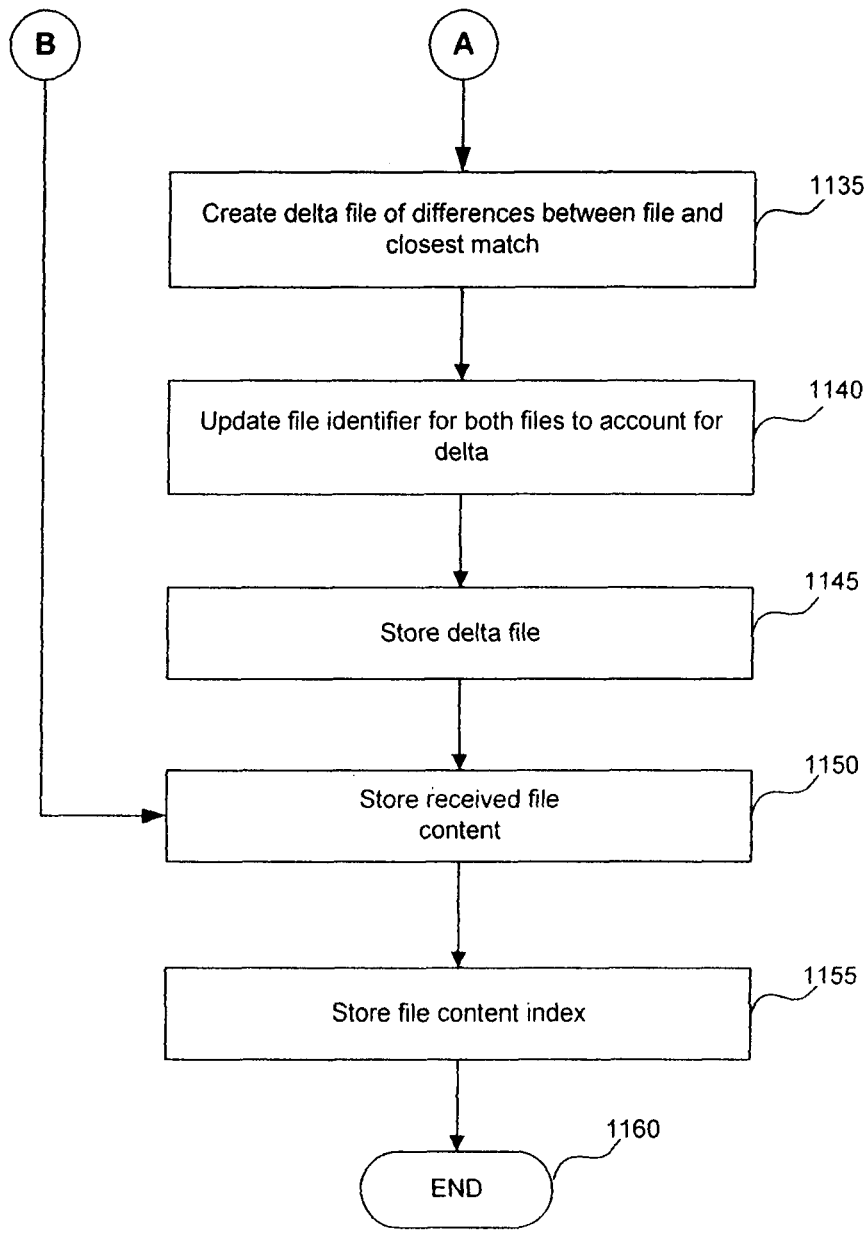

FIGS. 11A and 11B provide a flow chart of method 1100 to store distributed content using a content similarity test, according to an embodiment of the invention. Method 1100 begins in step 1105. In step 1105, a file is received. For example, the file could be received by indexed archive system 110. In step 1110, a file content index is generated. For example, indexing engine 310 can generate a file content index. In step 1115, the file content index for the received file is compared to the file content indexes of stored files. In one example, the file content indexes are stored in content repository 345 and indexing engine 310 does the comparison. In step 1120, a determination is made whether the similarity of the file content index for the received file and at least one stored file content index exceeds a similarity threshold. In one example, indexing engine 310 makes this determination.

If the similarity threshold is not exceeded, method 1100 proceeds to step 1150. If the similarity threshold is exceeded, method 1100 proceeds to step 1125. In step 1125, the differences between the received file and files that exceeded the similarity threshold are compared. In one example, the differences are determined by indexing engine 310. In step 1130, the file that most closely matches the received file is identified. In step 1135, a delta file of the differences between the received file and the closest match file is created. The delta file that is created can be generated either by forward or backward differencing, or both, between the received and stored file. In one example, content engine 320 can create the delta file. In step 1140, a file identifier for the received file and its closest match is updated to identify the existence of the delta file. If both differencing approaches are used, two delta files can be stored. In one example, these steps can be done by content engine 320. In step 1145, the delta file is stored. In one example, content engine 320 can store the delta file in content repository 345. In step 1150, the received file content is stored. In step 1155, the file content index for the received file is stored. In one example, indexing engine 310 stores the file content index in index repository 335.

In an alternative embodiment of method 1100, delta files can be created for all stored files that exceed a similarity threshold. In this case, their file identifiers would be updated to reflect the similarity, and a delta file for each of the stored files that exceeded a similarity threshold would be stored.

Figure 12A:
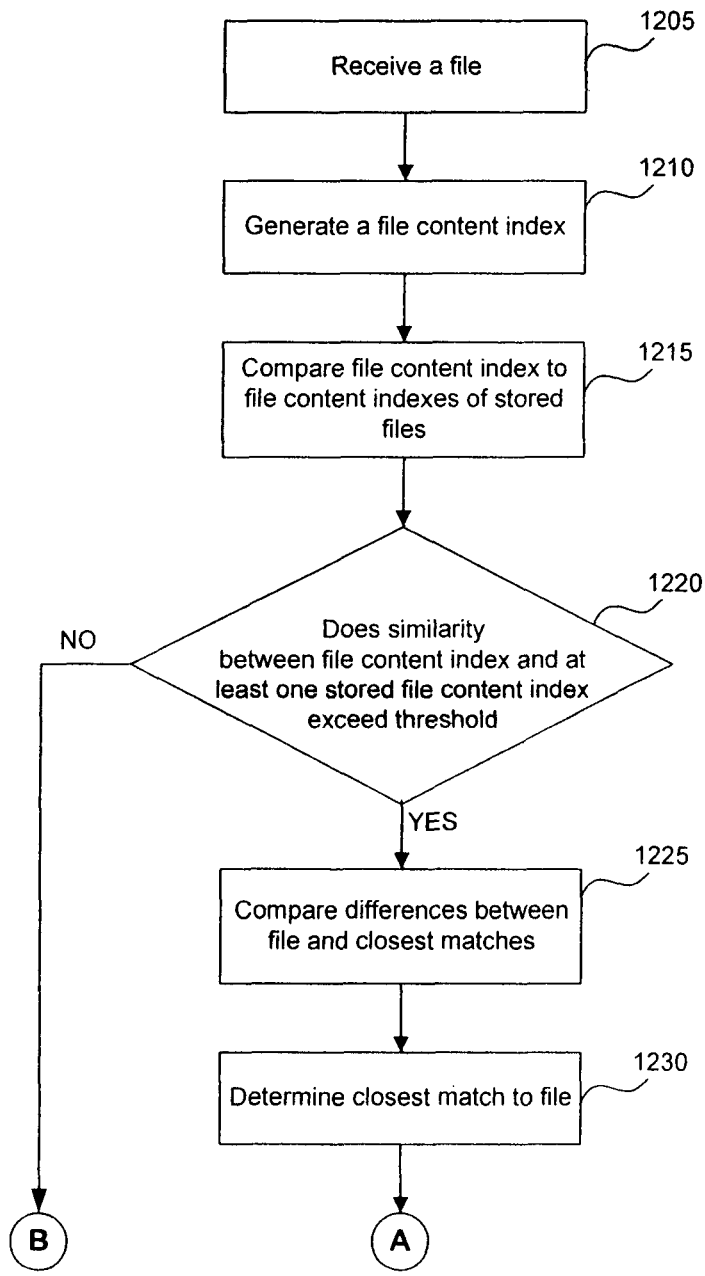
FIGS. 12A and 12B are flow charts of a method to store distributed content and conserve system resources, according to an embodiment of the invention.
Figure 12B:
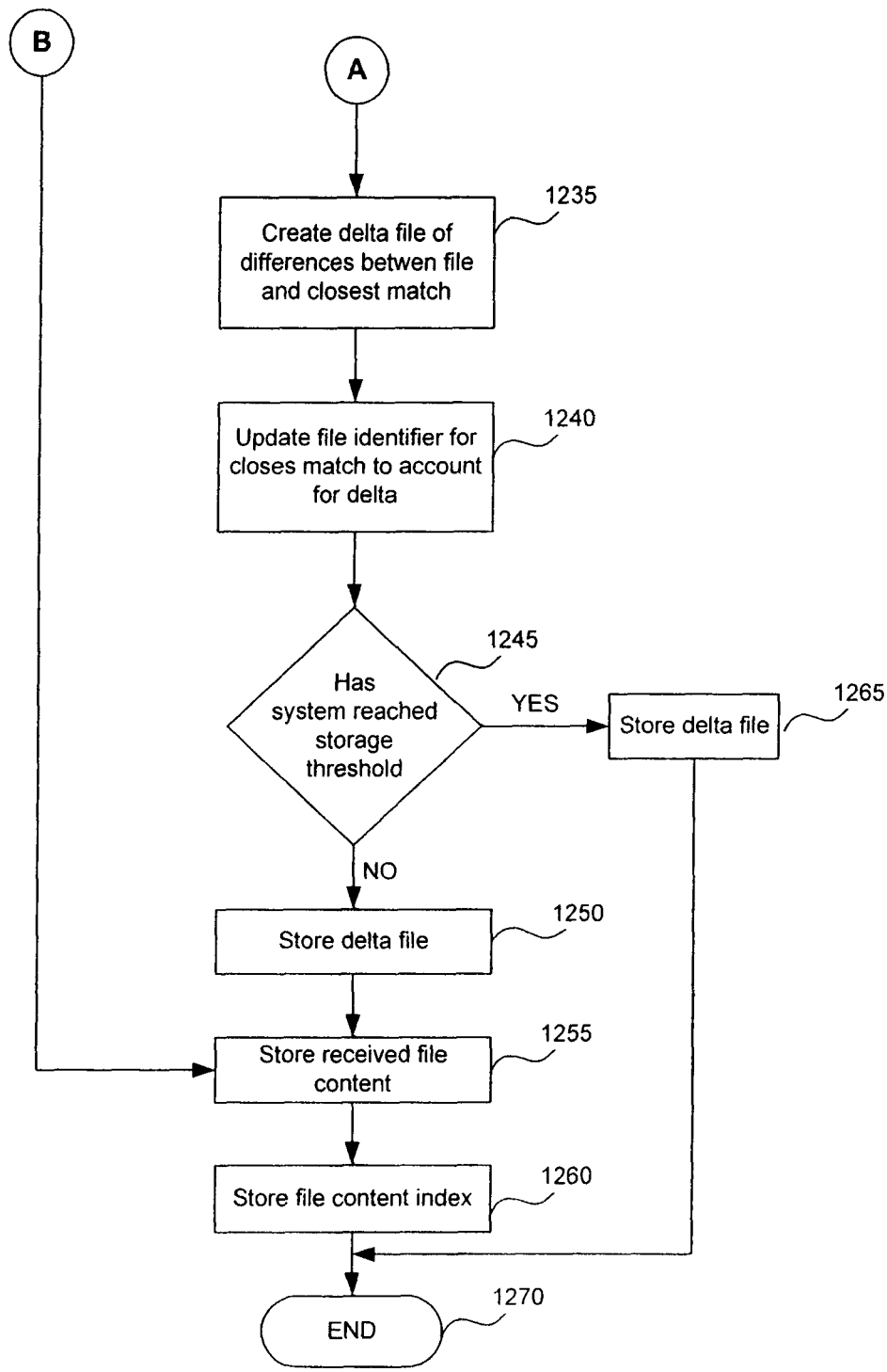

FIGS. 12A and 12B provide a flow chart of method 1200 to store distributed content and conserve system resources, according to an embodiment of the invention. Method 1200 begins in step 1205. In step 1205, a file is received. For example, a file can be received by index archive system 110. In step 1210 a file content index is generated. In one example, indexing engine, such as index engine 310, generates the file content index. In step 1215, the file content index for the received file is compared to the file content indexes of stored files. In step 1220, a determination is made whether the similarity of the file content index for the received file and at least one stored file content index exceeds a similarity threshold. In one example, indexing engine 310 conducts the comparison and determines whether a similarity threshold has been met.

If the similarity threshold is not exceeded, method 1200 proceeds to step 1255, and method 1200 proceeds as discussed below. If the similarity threshold is exceeded, method 1200 proceeds to step 1225. In step 1225, the differences between the received file and files that exceeded the similarity threshold are compared. In one example, the differences are determined by indexing engine 310. As in method 1100, either or both forward and backward differencing can be used. In step 1230, the file that most closely matches the received file is determined. In step 1235, a delta file of the differences between the received file and the closest match file is created. In one example, content engine 320 can create the delta file. In step 1240, a file identifier for the received file and its closest match is updated to identify the existence of the delta file. In step 1245, a determination is made whether a storage factor, such as a storage threshold, has been reached. In one example, storage thresholds can be set for the indexing repository 335, metadata repository 340 or content repository 345, or any combination thereof. The storage threshold can be set to be equal to a percentage of the total storage capacity of the devices. In alternative embodiments, other factors can be used to determine whether a file or a portion of a file should be saved. Such factors can be based on the type of file, the user of the file, the importance of the file, and any combination thereof, for example.

If a determination is made that a storage threshold has been met or exceeded, method 1200 proceeds to step 1265. In step 1265, the delta file is stored. Method 1200 then proceeds to step 1270 and ends. If on the other hand, in step 1245 a determination is made that a storage threshold has not been met, method 1200 proceeds to step 1250. In step 1250, the delta file is stored. In step 1255, the received file content is stored. In step 1260, a file content index for the received file is stored. In step 1270, method 1200 ends.

Figure 13A:
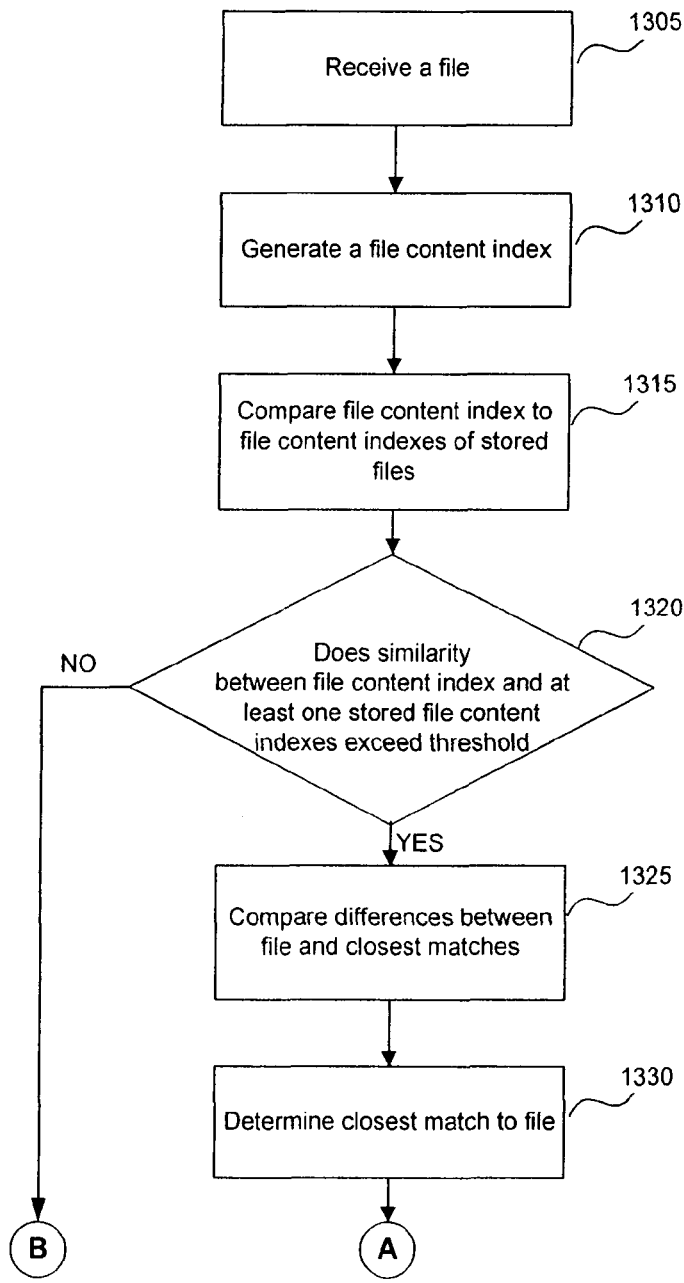
FIGS. 13A and 13B are flow charts of a method to store distributed content and identify relationships between files, according to an embodiment of the invention.
Figure 13B:
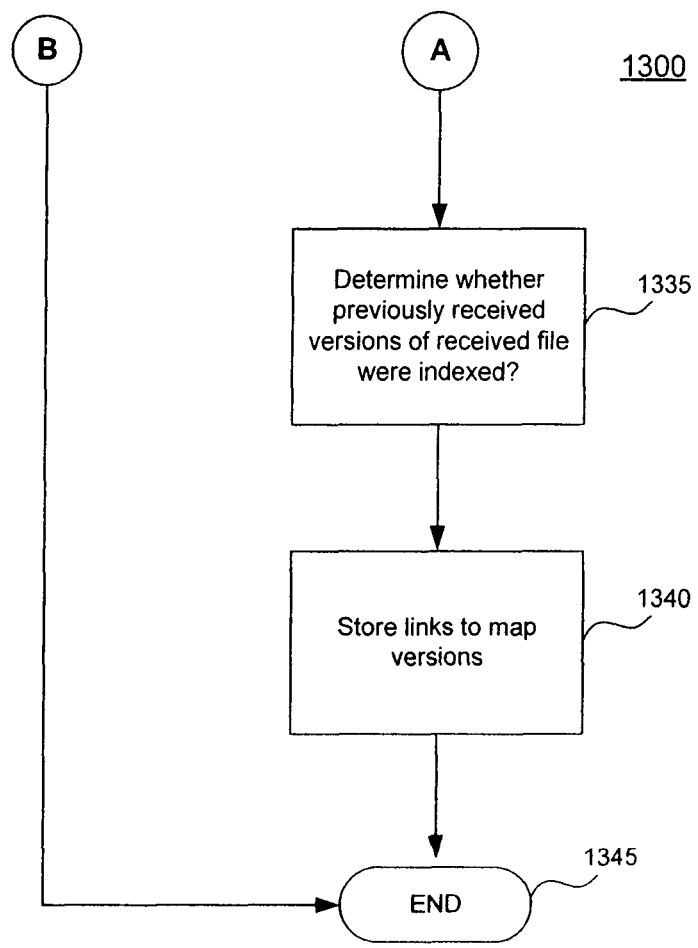

FIGS. 13A and 13B provides a flow chart of method 1300 to store distributed content and identify relationships between files, according to an embodiment of the invention. Method 1300 begins in step 1305. In step 1305, a file is received. For example, the file can be received by indexed archive system 110. In step 1310 a file content index is generated. For example, indexing engine 310 can generate a file content index. In step 1315, the file content index for the received file is compared to the file content indexes of stored files. In step 1320, a determination is made whether the similarity of the file content index for the received file and at least one stored file content index exceeds a similarity threshold. In one embodiment, the comparison and determination is made by indexing engine 310. If the similarity threshold is not exceeded, method 1300 proceeds to step 1345 and ends. If the similarity threshold is exceeded, method 1300 proceeds to step 1325. In step 1325, the differences between the received file and files that exceeded the similarity threshold are compared. In one embodiment, the differences are determined by indexing engine 310. As in method 1100 or 1200, either or both forward and backward differencing can be used. In step 1330, the file that most closely matches the received file is determined. In step 1335, a determination whether previously received versions of the received file were indexed is made. In one example, indexing engine 310 can be used to determine whether previously received versions of the received file were indexed. In step 1340, links to map previous versions of the received file with the received file are stored. In one example, metadata engine 315 can store the links in metadata repository 340. In step 1345, method 1300 ends. In an alternative embodiment, a link can be stored to identify that the received file shares content indexes exceeding a similarity threshold with one or more files that are not previous versions of the received file.

Content Signatures and File Identicality

The ability to efficiently identify files that have identical content has tremendous value. For example, if the file content of a new file for storage matches the file content of a file that has already been stored and this is known before the file is sent to a backup server, then the file does not need to be sent to a backup server. In this situation only its metadata need be sent, which is typically much smaller than the file contents, thereby saving significant storage space.

In another example, within a large corporation there are often thousands of computers running the same version of Windows. The first computer to be backed up will send all of its files to the backup server (e.g., indexed archive system 110)—as the server has not yet seen any file contents. This will take as long as a current full backup takes today. The second computer, on the other hand, will have thousands of files that are identical to the first computer, such as, the operating system, application, configuration, and common documents and data files, with perhaps only a few configuration or hardware specific files that are different. Those files that are identical will not need to have their content stored. Thus, the backup will take much less time. As more computers are backed up, the occurrence of new, unique content files will trend downward.

New content tends to come to a computer two ways. Content can be created by the user (e.g., a new or modified document, spreadsheet, presentation, etc.), or content arrives over the network either via email or through a file copy from some network device. If one user creates a new presentation and sends it to 50 other people, those 50 copies are identical to the original on the creator's system. In these situations, only new content needs to be fully backed up, thus significant storage space and back-up processing time can be reduced.

Figure 14:
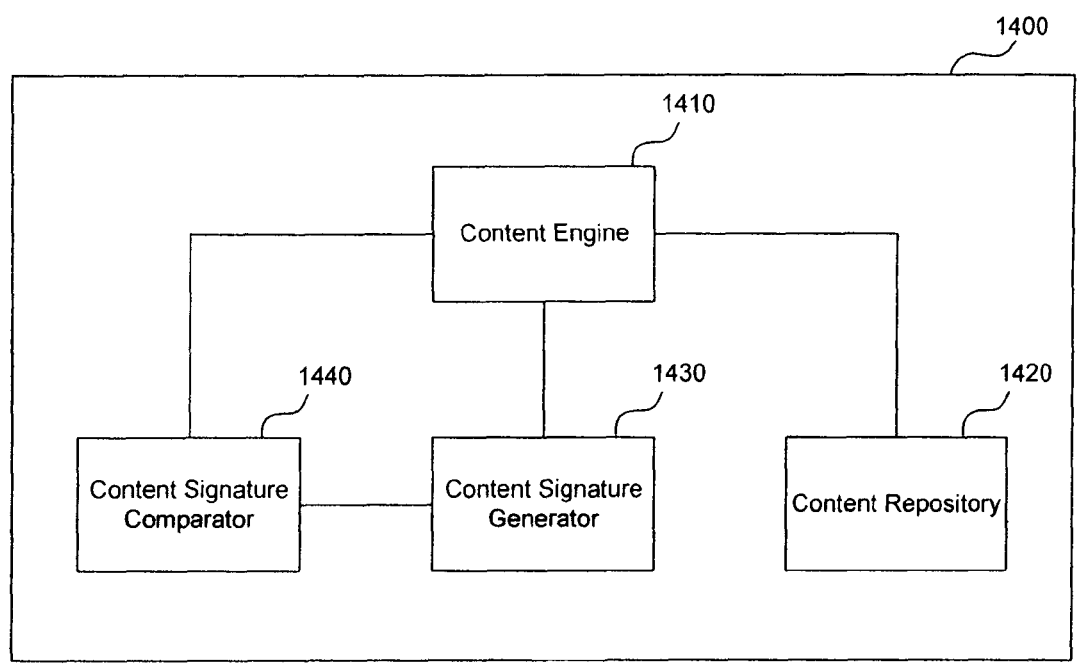
FIG. 14 is a diagram of a data management system, according to an embodiment of the present invention.

Additionally, the knowledge of file identicality (i.e., whether files have identical content) is tremendously powerful. As explained below, having knowledge of file identicality enables powerful new business methods for managing data. These business methods include, but are not limited to, Sarbannes-Oxley compliance (ie., efficiently storing and retrieving files that must be saved or controlled under the Sarbannes-Oxley legislation), virus detection, copyright management, and pornographic material control. Systems for Distributed Data Storage and Management Using Content Signatures to Implement File Identicality-Based Business Methods FIG. 14 provides a diagram of a file management system 1400, according to an embodiment of the present invention. File management system 1400 includes content engine 1410, content repository 1420, content signature generator 1430 and a content signature comparator 1440.

Content engine 1410, like content engine 320, stores file content that was received. As explained with reference to content engine 320 in FIG. 3, the file content along with the relationship between the content data and a primary identifier are stored in a content repository, such as content repository 1420. Content signature generator 1420 generates a content signature that serves as a primary identifier. In an embodiment, content signature generator 1420 computes the content signature based on the particular content. The primary identifier is a unique identifier for the file content that can be referred to as the content signature. In an embodiment, content signature generator 1430 generates a hash function signature for a file, which serves as a unique identifier for the file.

While hashing functions generally require a complex computation, computing hash function signatures as content signatures for files is well within the capabilities of present day computers. Hashing functions are inherently probabilistic and any hashing functions might possibly produce incorrect results when two different data files happen to have the same value. In embodiments, the present invention uses well known hashing functions, such as SHA-1, MD2, MD4, MD5, HAVAL, RIPEMD-128, RIPEMD-256, RIPEMD-160, RIPEMD-320, Tiger, SHA-2 (SHA-224, SHA-256, SHA-384, and SHA-512), Panama, and Whirlpool algorithms, to reduce the probability of collision down to acceptable levels that are far less than error rates tolerated in other computer operations and file management systems. In the case of MD5, the hash signature and length of the file can be used as the unique content signature. By using the length, this can further improve the integrity of the signature. The invention is not limited to the use of these hash functions. Furthermore, since a given signature method might be "broken" at some point in the future, several different signature methods can be used on each content piece. Thus, if one signature method is broken, the system can still be used effectively.

In an alternative embodiment, content signature generator 1430 can assign a content signature, rather than computing one as described above. One such form of an assigned signature can be a sequence number. Under this approach there are several computationally reasonable ways to determine whether a file content already has a sequence number or key.

The first is the use of a hash table, which is different than the type of hashing referred to above with the computed content signature approach. In this case, the simpler hashes that will be used will generally have more collisions (e.g., more than one file potentially having the same hash key). The second approach is to use a finite state machine based on the file contents analyzed and applying the finite state machine on each new file content received to recognize whether it has been seen before. The final approach is to sort the file contents that have been seen and using a fast look up based on the sorting. Using the assigned signature embodiment limits the functionality of the system with respect to the types of applications that can be implemented. In particular, functionalities such as finding/counting/deleting files will work. Additionally, functionalities related to reporting on filenames that have surprising content (e.g., virus infected files; someone trying to hide a file content by giving it the name of a common system file) and registries internal to an organization will also work. Lastly, functions related to controlled file copies (e.g., classified, blocked, obsolete) will work as well. Functions that do not work as well include cross organization registries (e.g., lists related to classified files) Applications based on identicality and file signatures are discussed further below.

Content signature comparator 1440 compares content signatures. For example, when a new file is received by content engine 1410 content signature generator 1430 generates a content signature for the new file. Content signature comparator 1440 then compares the content signature for the new file to existing content signatures for the file content already stored in content repository 1420. File management system 1400 can then take an appropriate action based on the result of the comparison. In one instance, if the content signature of the new file matches a content signature for an existing file then the file management system does not need to store the new content. Rather file management system 1400 can provide an indication to an indexed archive system, such as indexed archive system 110 to only store metadata associated with the new file along with an association with the existing content signature.

Figure 15:
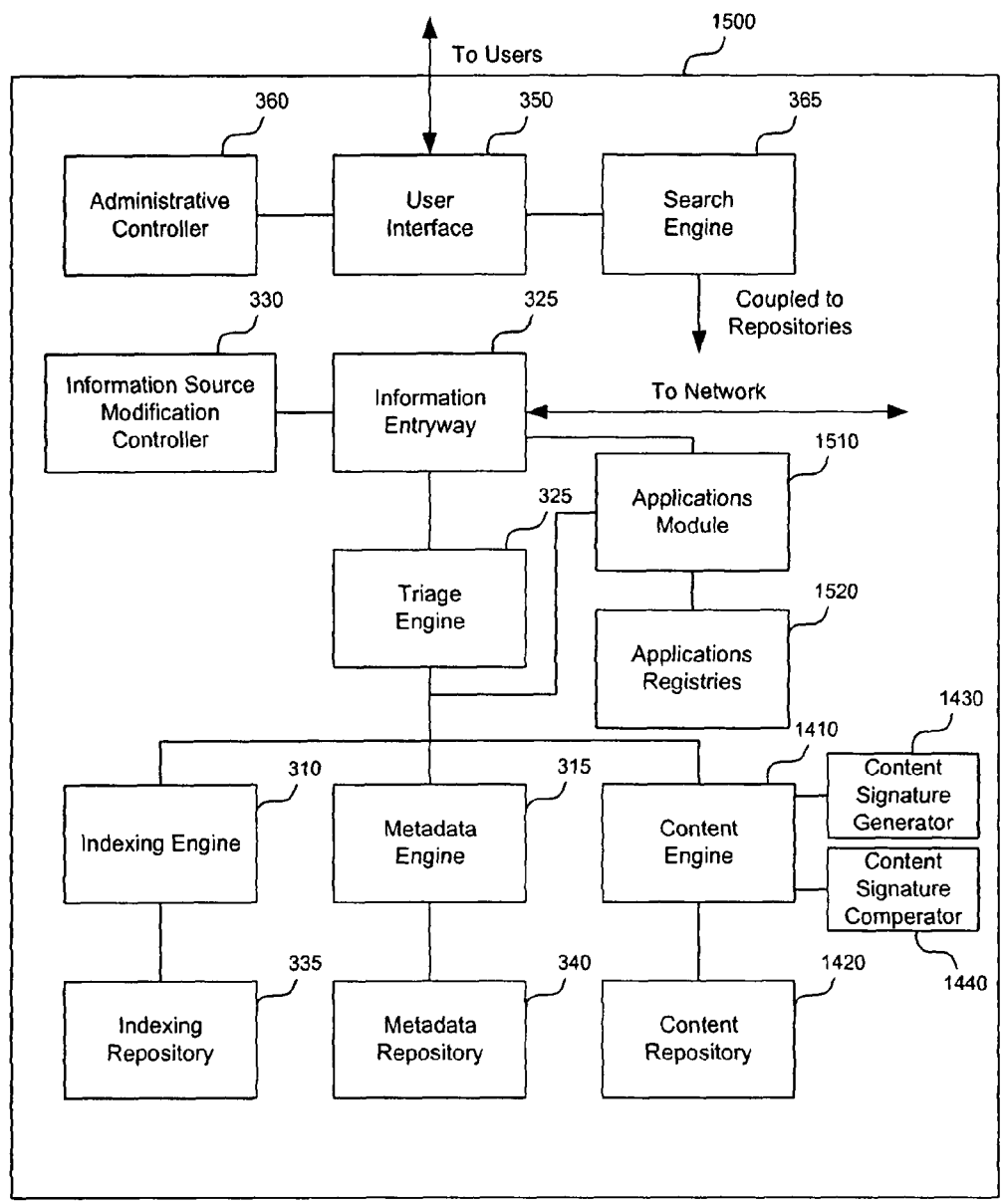
FIG. 15 is a diagram of an indexed archive system that highlights content signature functionality, according to an embodiment of the invention.

In an embodiment, as illustrated in FIG. 15, file management system 1400 can form a portion of indexed archive system 110. Indexed archive system 1500 is the same as indexed archive system 110, except that content signature generator 1430 and content signature comparator 1440 are explicitly identified. Content engine 1410 is the same as content engine 320 and content repository is the same as content repository 345. While content signature generator 1430 and content signature comparator 1440 are identified as separate functional blocks in FIG. 15 for ease of illustration, one or both of these functional blocks can be included within content engine 1410.

Additionally, indexed archive system 1500 includes applications module 1510 and application registries 1520. Applications module 1510 includes applications to manage files and implement the various methods as described below with respect to FIGS. 17 through 30. For example, applications module 1510 can include, but is not limited to a file update application, a information source client characterization application, and a search application that use content signatures to implement the applications by using file identicality. Applications registries 1520 store registries of content signature lists that support various applications. For example, applications registries 1520 can include, but is not limited to, a blocked file content signature registry, a pornographic file content signature registry, a copyright file content signature registry, and a confidential document content signature registry. These applications and registries are described more completely with reference to FIGS. 17-30 below.

In an alternative approach, the functionality to generate and compare content signatures can be located within an information source client agent, such as information source client agent 120.

Figure 16:
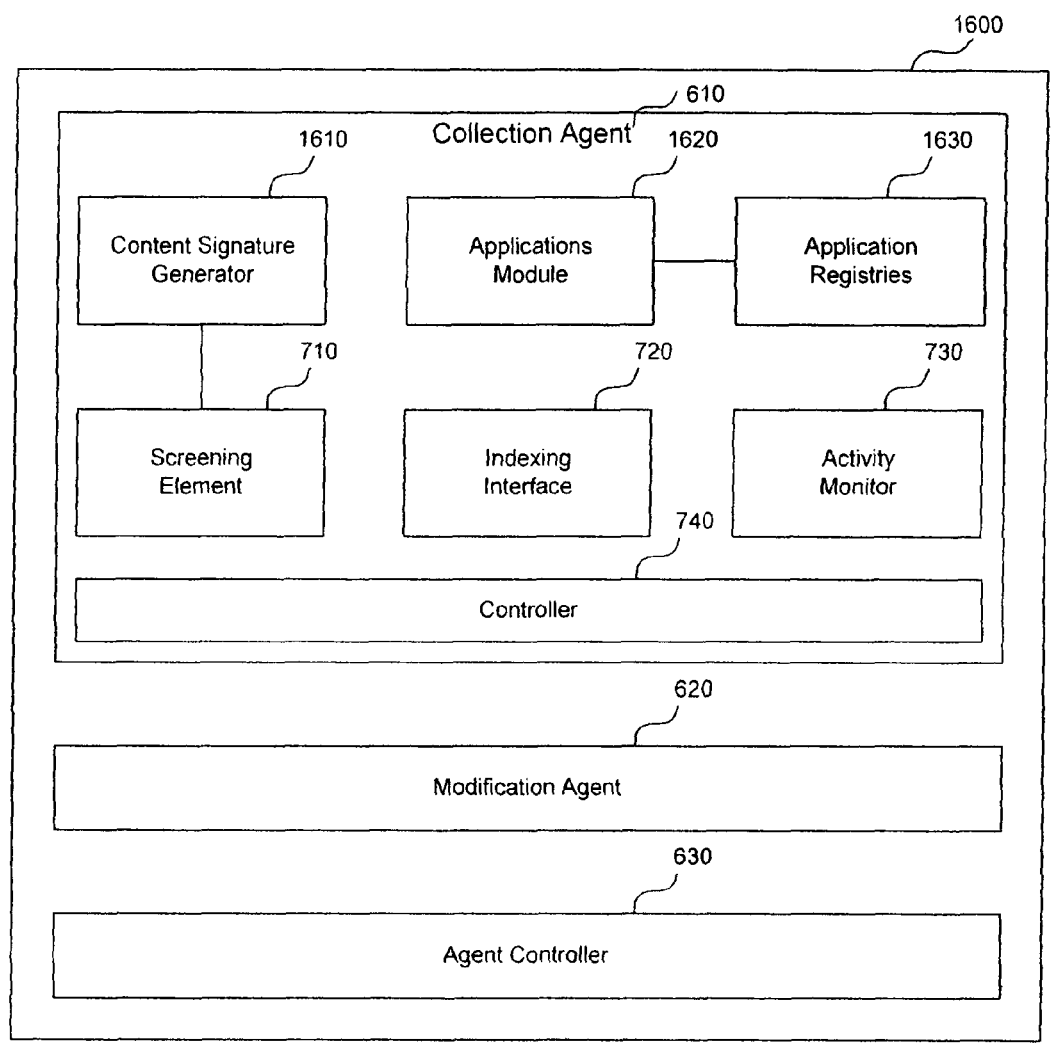
FIG. 16 is a diagram of an information source agent that highlights content signature functionality, according to an embodiment of the invention.

FIG. 16 provides a diagram of information source agent 1600, according to an embodiment of the invention. Information source agent 1600 is the same as information source agent 120 with the exception that content signature generator 1610 and content signature comparator 1620 are explicitly shown. Information source agent 1600 includes information source collection agent 610, modification agent 620 and agent controller 630.

As discussed above, information source collection agent 610 includes screening element 710, indexing interface 720, activity monitor 730 and controller 740. Screening element 710, indexing interface 720, and activity monitor 730 are coupled to controller 740. Screening element 710 assesses whether a file should be transmitted to an indexed archive system, such as indexed archive system 110. Screening element 710 is coupled to content signature generator 1610. Content signature generator 1610 generates the primary identifier. As discussed above with respect to content signature generator 1610, the primary identifier is a unique identifier for the file content that can be referred to as the content signature. In an embodiment, as in the case of content signature generator 1430, content signature generator 1610, generates a hash function signature for a file, which serves as a unique identifier for the file. While content signature generator 1610 is shown as a separate functional block, the functionality of content signature generator 1610 can be included within indexing interface 720 or other functional blocks.

Indexing interface 720 communicates with an indexing system, and can index files locally on the information source client. When an information source receives, creates or modifies a file, indexing interface 720 transmits the content signature generated by content signature generator 1430 to a data storage system, such as indexed archive system 1500. Indexed archive system 1500 compares the content signature for the new or modified file to content signatures of stored files, then requests that information source agent 1600 either transmit the file contents for the new or modified file or simply transmit metadata information if the file contents are already stored on indexed archive system 1600. Indexing interface 720 receives instructions based on the content signature from indexed archive system 1500, and performs the appropriate action. For example, indexed archive system 1500 may request that the file and metadata be transferred. In which case, indexing interface 720 transmits both the file and meta data. Or indexed archive system 1500 may request that only the meta data be transferred if the content signature already exists on indexed archive system 1500. In this case, indexing interface 720 only transmits the file metadata.

Activity monitor 730 gathers information about file activity, such as creation, usage, modification, renaming, persons using a file, and deletion. Activity monitor 730 can also gather information about intermediate content conditions of files between times when files are backed up.

Additionally, as in the case of indexed archive system 1500, information source client 1600 includes applications module 1620 and application registries 1630. Applications module 1620 includes applications to manage files and implement the various methods as described below with respect to FIGS. 17 through 30. For example, applications module 1620 can include, but is not limited to a file update application, an information source client characterization application, and a search application that uses content signatures to implement the applications by using file identicality. Applications registries 1630 store registries of content signature lists that support various applications. For example, applications registries 1630 can include, but is not limited to, a blocked file content signature registry, a pornographic file content signature registry, a copyright file content signature registry, and a confidential document content signature registry. These applications and registries are described more completely with reference to FIGS. 17-30 below.

Information source agent 1600 can also record or count file reads and report that information to indexed archive system 1500. In this way, an administrator can know which files are commonly read instead of just knowing which are stored, present or deleted. Furthermore, information source agent 1600 can make a copy of a file before it is modified or deleted and save the original copy until indexed archive system 1500 has archived the original. This allows indexed archive system 1500 to save all file contents even those that are short-lived that were not present long enough to see a backup cycle. Information source agent 1600 can also make a copy of any file being read from external media even if the file is not copied onto the hard drive of the information source client. This allows indexed archive system 1500 to know about all files that an employee reads on a company machine even if it is from a non-company data source. This concept can be extended such that information source agent 1600 can make a copy of everything on an external media device.

Information source agent 1600 can be implemented in software, firmware, hardware or any combination thereof. Typically, information source agent 1600 will be implemented in software.

Methods to Store a Data File Using File Identicality

Figure 17:
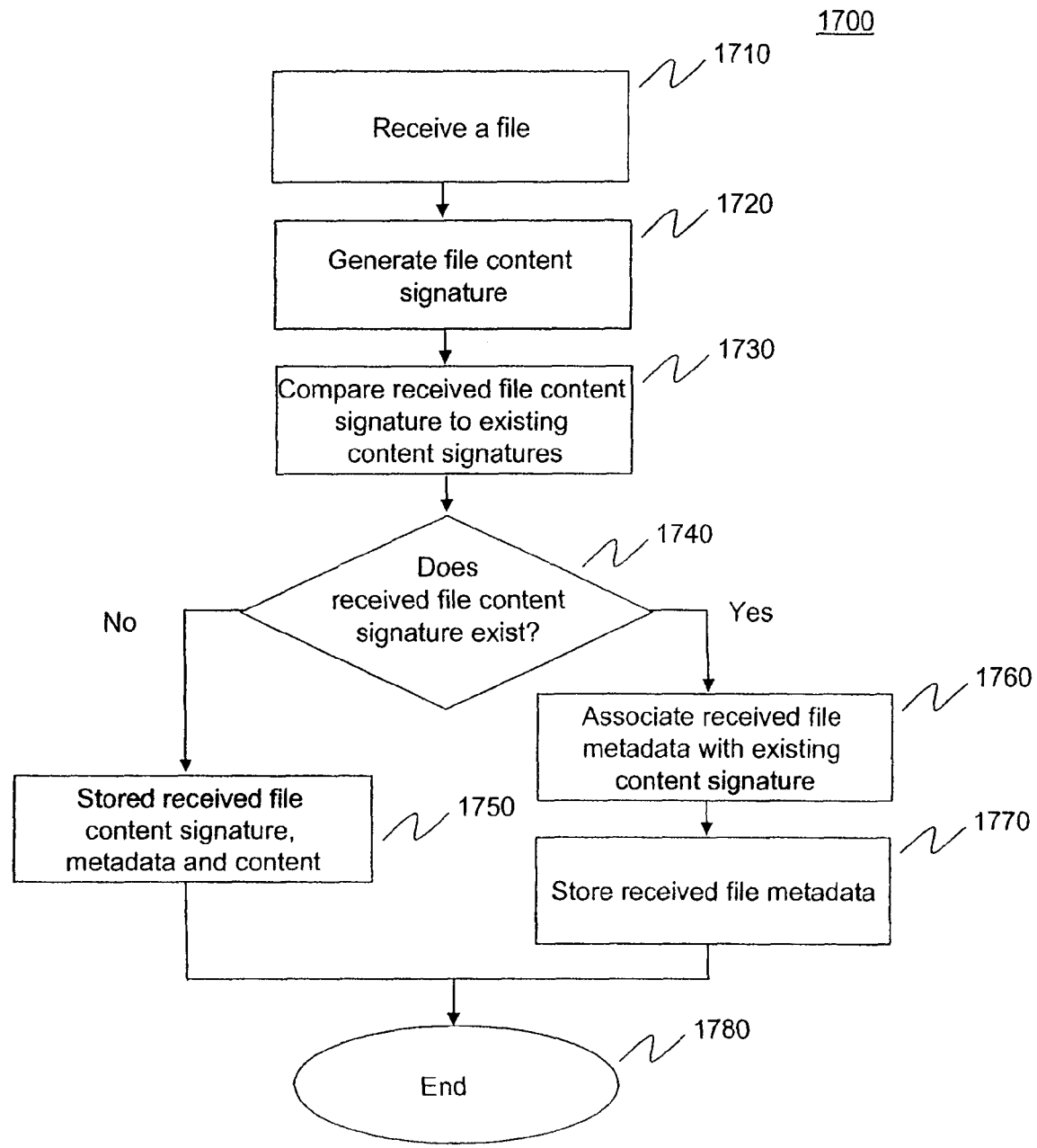
FIG. 17 is a flowchart of a method for storing a file using file identicality, according to an embodiment of the invention.

FIG. 17 provides a flowchart of method 1700 for storing a file using file identicality, according to an embodiment of the invention. Method 1700 begins in step 1710. In step 1710 a file is received. A file includes, but is not limited to a data file, application file, system file and/or programmable ROM file. For example, indexed archive system 1500 can receive a file that was transmitted from information source agent 1600. Alternatively, information source agent 120 can receive a file. In step 1720 a content signature is generated for the received file. A content signature is a unique file identifier that can be generated by applying a hashing function to the received file using an algorithm that includes, but is not limited to, the SHA-1, MD2, MD4, MD5, HAVAL, RIPEMD-128, RIPEMD-256, RIPEMD-160, RIPEMD-320, Tiger, SHA-2 (SHA-224, SHA-256, SHA-384, and SHA-512), Panama, and Whirlpool hashing algorithms. For example, content signature generator 1430 can generate a content signature for the received file.

In step 1730 the content signature for the received file is compared to the content signatures for existing files. For example, content signature comparator 1440 compares the received file content signature to all content signatures for files already stored within content repository 1420.

In step 1740 a determination is made whether the received content signature matches any previously stored content signatures. For example, content signature comparator 1440 determines whether the received file content signature matches any of the content signatures stored in content repository 1420. If a match does not exist, method 1700 proceeds to step 1750.

In step 1750, the file content signature and content for the received file are stored. For example, indexed archive system 1500 stores the file content signature and content for the received file in content repository 1420. Indexed archive system 1500 also stores metadata for the received file in metadata repository 340. In an embodiment one or more relational databases is used to store the file content, file content signatures and/or metadata. Method 1750 then proceeds to step 1780 and ends.

Referring back to step 1740, if a match does exist, method 1700 proceeds to step 1760. In step 1760 metadata for the received file is associated with the existing content signature that matches the received file content signature. For example, metadata engine 315 generates metadata for the received file. Alternatively, metadata can be generated by an information source agent, such as information source agent 1600, that transmits the metadata to indexed archive system 1500. Metadata engine 315 associates the metadata for the received file to the content signature and content that already exists within content repository 1420.

In step 1770 metadata for the received file is stored. For example, metadata engine 315 stores the metadata in metadata repository 340. No content for the received file is stored, because it already exists based on the determination that a matching content signature was determined. Method 1700 proceeds to step 1780 and ends.

Methods for Storing Multi-Segmented Content Using Content Signatures

An extension to above method 1700 for storing files using content signatures to improve storage efficiency involves the storage of multi-segmented content. Separate content signatures can be generated for each content segment within multi-segmented content such as a mail file, an fmail file, a compressed file archive (e.g., zip, rar, or compressed tar), a non compressed file archive (e.g., shar or tar), an entertainment collection (e.g., audio, video, audio video, and/or computer games), a multi-part web page, a multi-page presentation, a multi-part Office document, a multi-page image file, image files with OCR, speech files with audio transcripts, system paging file, swap file, a log file, a database, a table, an append only file, an instant messenger archive, a chat archive, a history file, a journal, a virtual file system, and a revision control repository including SVN archives or ramdisk file. For example, when someone zips a set of files, it is possible to know that the new zip file contains a set of already known content signatures. The zip file can actually be stored by its content signatures and path data for the zip file. Storing only the content signatures for the files contained within a zip file significantly reduces storage needs.

Figure 18:
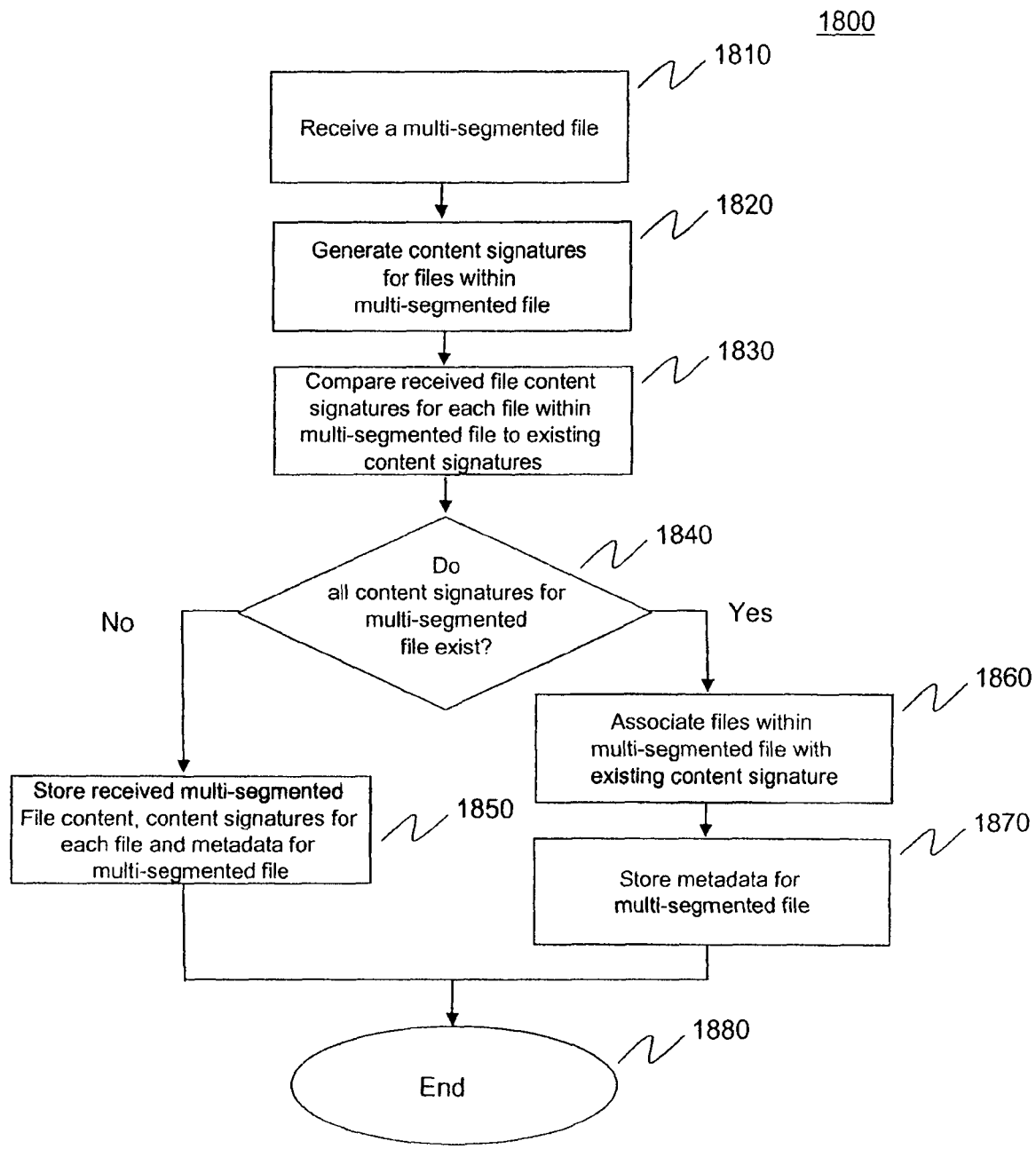
FIG. 18 is a flowchart of a method for storing a multi-segmented file using file identicality, according to an embodiment of the invention.

FIG. 18 provides a flowchart of method 1800 for storing a multi-segmented file using file identicality, according to an embodiment of the invention. Method 1800 begins in step 1810. In step 1810 a multi-segmented file is received. A multi-segmented file includes, but is not limited to a zip file, tar files and mailbox files. For example, indexed archive system 1500 can receive a multi-segmented file that was transmitted from information source agent 1600. Alternatively, information source agent 1600 can receive a file. In step 1820 a content signature is generated for each file within the received multi-segmented file. For example, content signature generator 1430 or content signature generator 1610 can generate a content signature for the received file.

In step 1830 the content signatures for each of the files within the received multi-segmented file are compared to the content signatures for existing files. For example, content signature comparator 1440 compares the received file content signature to all content signatures for files already stored within content repository 1420.

In step 1840 a determination is made whether the received content signatures match previously stored content signatures. For example, content signature comparator 1440 determines whether all of the file content signatures for files within the received multi-segmented file match content signatures stored in content repository 1420. If all content signatures for the received multi-segmented file do not match existing content signatures, method 1800 proceeds to step 1850.

In step 1850 the file content signatures for each of the files within the multi-segmented file are stored and content for the received multi-segmented file is stored. For example, indexed archive system 1500 stores the file content signatures and content for the received multi-segmented file in content repository 1420. Indexed archive system 1500 also stores metadata for the received multi-segmented file in metadata repository 340. Alternatively, indexed archive system 1500 can store metadata for each of the files within the received multi-segmented file. Method 1850 then proceeds to step 1880 and ends.

Referring back to step 1840, if a match exists for all content signatures for files within the received multi-segmented file, method 1800 proceeds to step 1860. In step 1860 metadata for the received file is associated with the existing content signature that match the received file content signatures. For example, metadata engine 315 generates metadata for each of the received files within the multi-segmented file. Metadata is also generated for the received multi-segmented file that identifies at least the content signatures of the files contained with the multi-segmented file and path data.

Alternatively, metadata can be generated by an information source agent, such as information source agent 1600, that transmits the metadata to indexed archive system 1500. Metadata engine 315 associates the metadata for the received file to the content signature and content that already exists within content repository 345.

In step 1870 metadata for the received multi-segmented file and each of the files contained within the multi-segmented file is stored. For example, metadata engine 315 stores the metadata in metadata repository 340. No content for the received file is stored, because it already exists based on the determination that a matching content signature was determined for each of the files within the received multi-segmented file. Method 1800 proceeds to step 1880 and ends.

Methods for Copyright Management Using File Identicality

In a further aspect of the invention, the invention provides methods for copyright management or licensed data file materials using file identicality. Content signatures for known copyrighted materials (e.g., programs, music, videos, text files) can be stored within indexed archive system 1500. By comparing content signatures of files received on computers within a network to content signatures of known copyrighted materials, copyright tracking and practice procedures can effectively be put into place. Similar controls can be put into place on a network to block pornography from being stored on computers. Specifically, the National Institute of Standards and Technology (NIST) publishes checksums (MD5) for all known pornography. Content signatures for files received can be compared to these known signatures, and an appropriate control action can take place, such as blocking these files from all computers, or notifying management when they appear on a computer.

Figure 19:
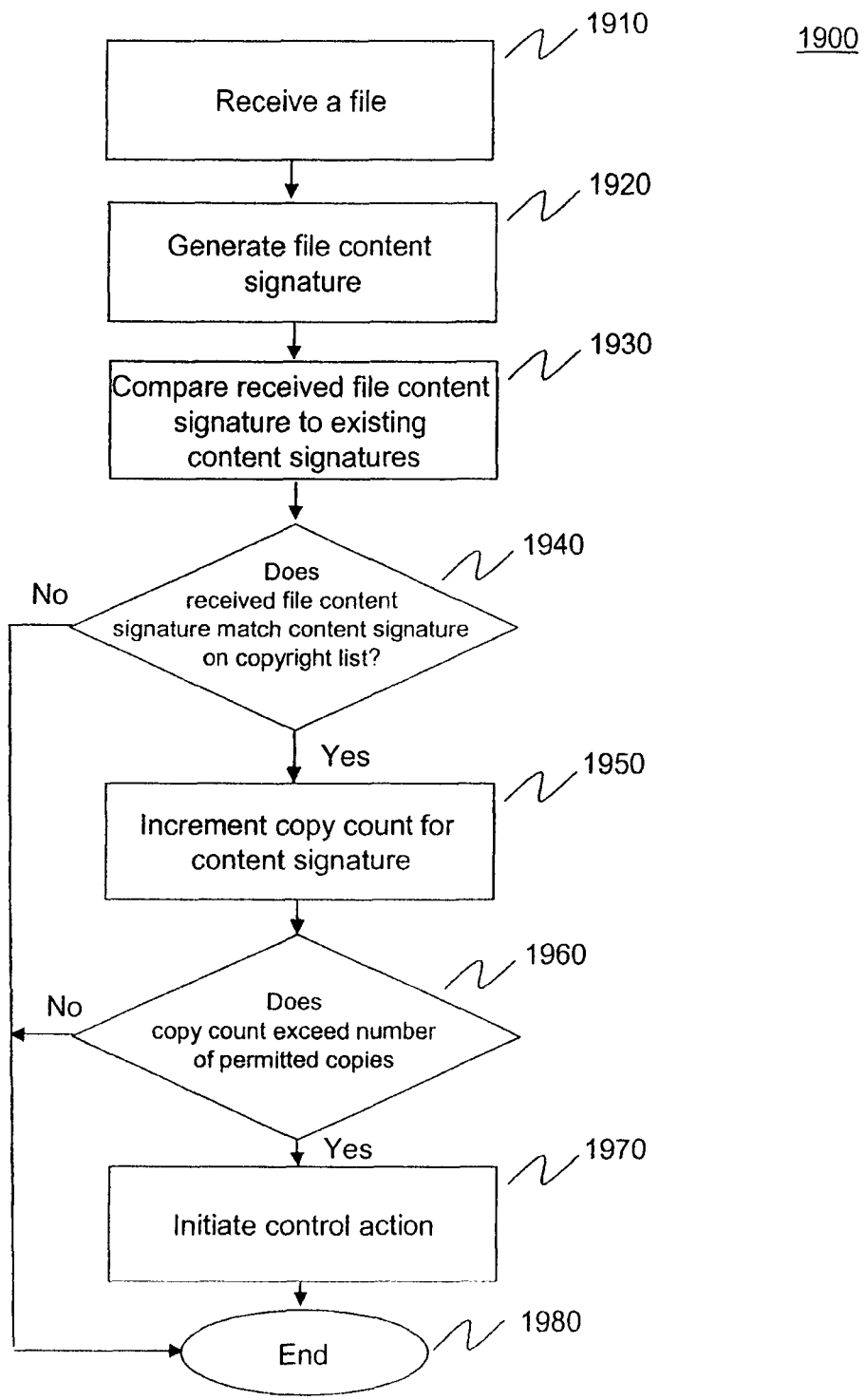
FIG. 19 is a flowchart of a method for managing copyrights using file identicality, according to an embodiment of the invention.

FIG. 19 provides a flowchart of method 1900 for managing copyrights using file identicality, according to an embodiment of the invention. Method 1900 begins in step 1910. In step 1910 a file is received. For example, indexed archive system 1500 can receive a file that was transmitted from information source agent 1600. Alternatively, information source agent 1600 can receive a file. In step 1920 a content signature is generated for the received file. For example, content signature generator 1420 can generate a content signature for the received file.

In step 1930 the content signature for the received file is compared to the content signatures for copyrighted files. For example, indexed archive system 110 can maintain a table or a copyright file content signature registry of content signatures for known copyrighted materials. Content signature comparator 1440 compares the received file content signature to all content signatures for content signatures within the copyright file content signature registry.

In step 1940 a determination is made whether the received content signature matches a content signature for a copyrighted material. For example, content signature comparator 1440 determines whether the received file content signature matches any of the content signatures stored in the copyright content signature table. If a match does not exist, method 1900 proceeds to step 1980 and ends. If a match does exist, method 1900 proceeds to step 1950.

In step 1950, the count is incremented for the number of copies located on the network supported by indexed archive system 110. For example, the copyrighted content signature registry can include a column that identifies the number of copies stored on the network. This value would be incremented by 1 when a new file is received with a content signature matching a copyright content signature.

In step 1960 a determination is made whether the count for copies of the copyright materials on the network exceed the allowable number of copyrights for the material. For example, the copyrighted content signature table can include a column that identifies the number of allowable copies to be stored on the network. This value can be compared against the actual number of files for the particular copyright content signature. If a determination is made that the number of copies on the network does not exceed the allowable number of copies, then method 1900 proceeds to step 1980 and ends. Otherwise, method 1900 proceeds to step 1970 and a control action is initiated. The control action can include notifying management that the copyright amount has been exceeded or may disable the application or file that was received that caused the copyright limit to be exceeded. In step 1980, method 1900 ends.

A similar process can be used to monitor pornographic files. In this case, indexed archive system 1500 can include a list of content signatures for known pornographic files and applications. In this case, when a received file has a content signature that matches one that is listed on the pornographic files content signature list, a control action can be initiated, such as notifying management and/or deleting the file from the user's computer, while saving a copy of the file for investigative purposes.

Methods for Document Retention Using File Identicality

Knowing that file content is identical allows operations that are currently impossible. For example, there are many contracts that require the recipient of information to destroy documents related to the contract and all copies when the contract ends. If the information is a set of files, it is nearly impossible today to find all copies, particularly if one of the recipients renamed the files. If the content was copied onto a computer and then emailed to tens or hundreds of other employees with a "need to know," there are no cost effective ways of finding all of the copies.

Figure 20:
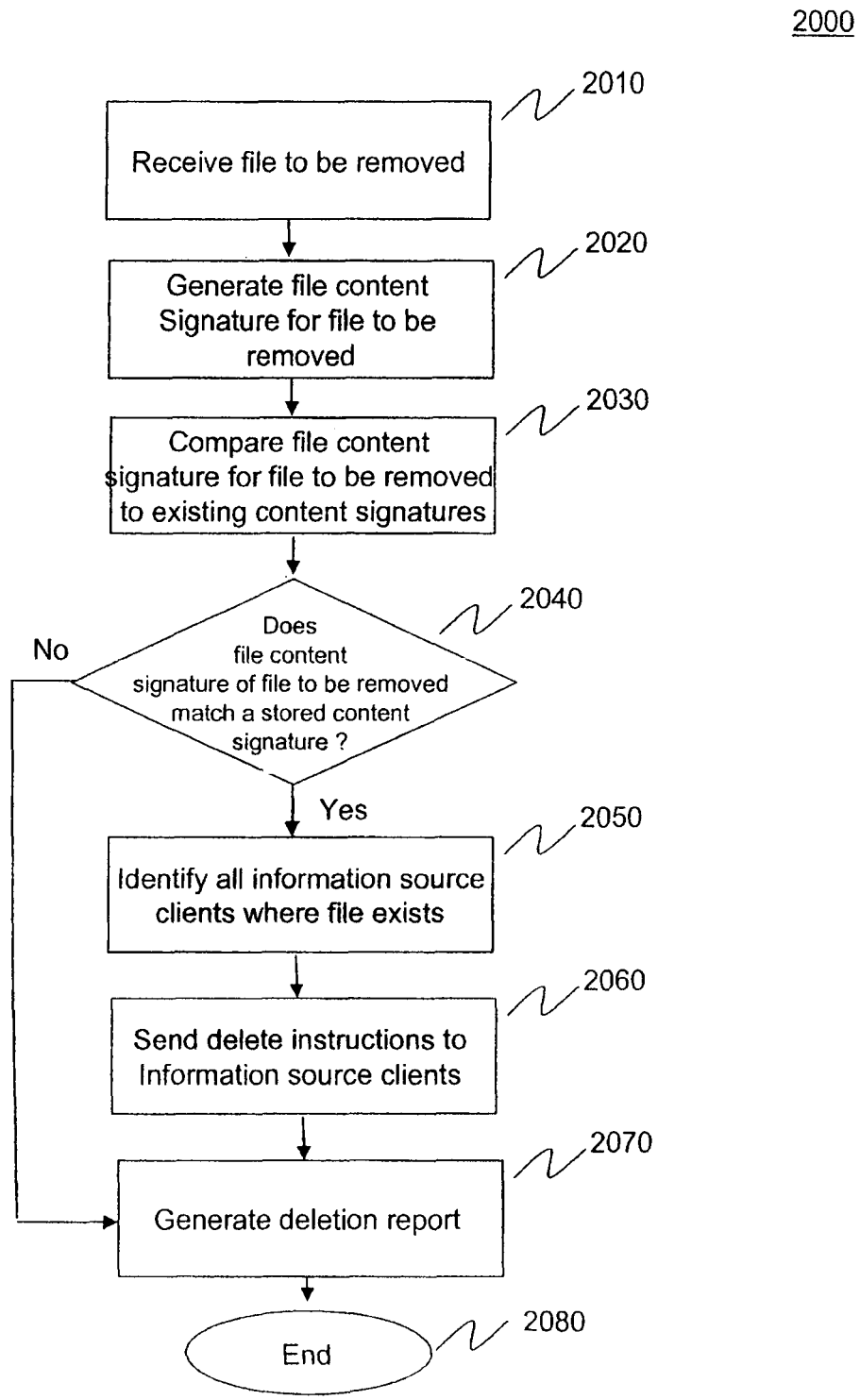
FIG. 20 is a flowchart of a method for deleting files across an entire network using file identicality, according to an embodiment of the invention.

The present invention addresses this challenge. FIG. 20 provides a flowchart of method 2000 for deleting files across an entire network using file identicality, according to an embodiment of the invention. Method 2000 begins in step 2010. In step 2010 a file to be removed is received. Alternatively, a content signature can be received or generated for a file to be removed. For example, indexed archive system 1500 can receive a file that was transmitted from a contract administrator with a request that all such files that exist on the company's network be deleted. The file could be, for example, a draft version of a contract or a confidential document that was used in the development of the contract. In step 2020 a content signature is generated for the received file to be removed. For example, content signature generator 1430 can generate a content signature for the received file.

In step 2030 the content signature for the received file to be removed is compared to the content signatures within content repository 1420.

In step 2040 a determination is made whether the content signature for the file to be removed matches a stored content signature. For example, content signature comparator 1440 determines whether the received file content signature matches any of the content signatures stored in content repository 1420.

If a match does not exist, method 2000 proceeds to step 2070. In step 2070, a deletion report is generated that indicates that no copies of the document were found within the network. In step 2080, method 2000 ends.

If a match does exist, method 2000 proceeds to step 2050. In step 2050, all information source clients where the file exists are determined. For example, metadata within metadata repository 340 can be reviewed to determine what information source clients contain the file to be removed. Alternatively, the content signatures within content repository 1420 can include an identifier for each of the information source clients that contain the file having the particular content signature. A determination of where copies of the file to be removed can then be made simply by reviewing the content signatures contained within content repository 1420.

In step 2060, a delete instruction is sent to all information source clients which have been determined to contain the file to be deleted. For example, indexed archive system 1600 transmits a delete instruction to each of information source agents 120. Information source agents 120 will then proceed to delete the file from the information source client that it is associated with. After successful deletion, the information source agents transmit a delete confirmation message back to indexed archive system 1500. Alternatively, the delete instruction can include a request to the file owner asking the file owner to delete the file. The delete instruction could also interface with a general remote administration tool including, for example, MICROSOFT SMS, AMDAHL A+ edition, and other system administration tools.

In step 2070, a deletion report is generated. For example, indexed archive system 1500 can generate a deletion report. The deletion report includes, but is not limited to, identifying the number of copies of the file that were found, the information source clients where the file existed, confirmation that the file was deleted and any error situation, for example, whether a file was unable to be deleted. In step 2080, method 2000 ends.

Methods to Control File Access Using File Identicality

Another application of the present invention relates to controlling file access based on file identicality information. Using file identicality information, a content block can be implemented at the individual or group level. For example, if a determination is made that a computer game is wasting employee time, it use can be blocked based on its content signature. Other file types can also be blocked at individual, group or corporate wide levels. For example, if some game is wasting employee time, then it can be blocked.

Content signatures can also be used to verify that a set of files does not have files from another set of files, such as, for example, open source files. By using open source files in a distribution, a company can lose ownership of some or all of the distribution. Thus, it is important to be able to identify that such open source files do not exist within a distribution.

An information technology department may also want to block any files on production/user systems that have not gone through an approval process. This can be limited to classes of files (e.g., DLLs—Dynamically Linked Libraries, or executables), or to hierarchies (e.g., C:\WINNT). If a user needs to install something not "authorized," then he can get an authorization from the information technology department, which will capture all of the relevant signatures and decide whether this is a single exception, or a set of signatures to allow everyone to have.

Figure 21:
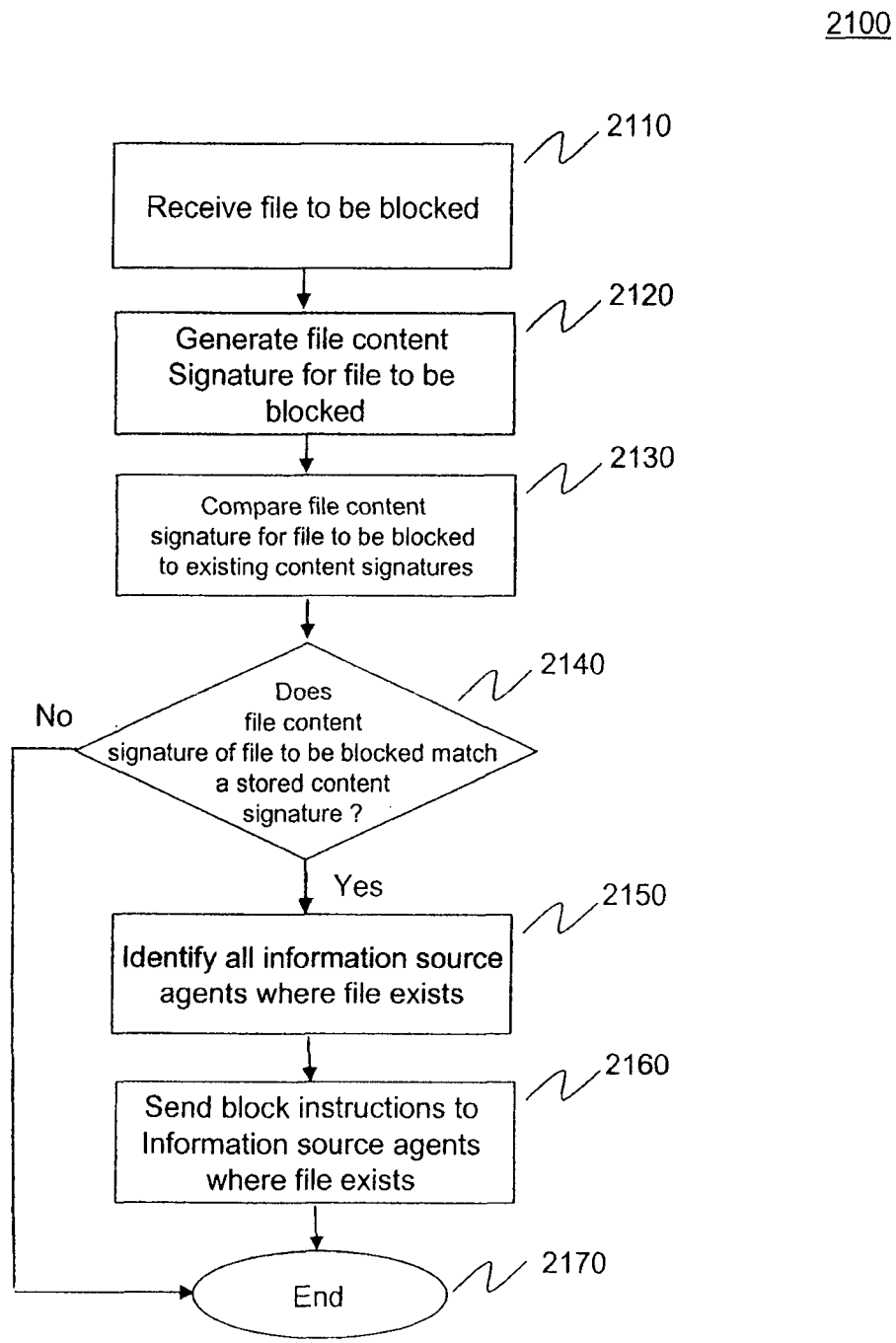
FIG. 21 is a flowchart of a method for blocking access to the use of files using file identicality, according to an embodiment of the invention.

FIG. 21 provides a flowchart of method 2100 for blocking access to the use of files using file identicality, according to an embodiment of the invention, that addresses the above file access control situations. Method 2100 begins in step 2110.

In step 2110 a file to be blocked is received. Alternatively, a content signature can be received or generated for a file to be blocked. The file that is to be blocked can be, for example, an application, such as a game that network users should not run, or a document that network users should not be able to use. For example, indexed archive system 1500 can receive a file that was transmitted from a company administrator with a request that all such files that exist on the company's network be blocked. In step 2120 a content signature is generated for the received file to be blocked. For example, content signature generator 1430 can generate a content signature for the received file.

In step 2130 the content signature for the received file to be blocked is compared to the content signatures within content repository 1420.

In step 2140 a determination is made whether the content signature for the file to be blocked matches a stored content signature. For example, content signature comparator 1440 determines whether the received file content signature matches any of the content signatures stored in content repository 1420.

If a match does not exist, method 2100 proceeds to step 2170. In step 2170, method 2100 ends.

If a match does exist, method 2100 proceeds to step 2150. In step 2050, all information source clients where the file exists are determined. For example, metadata within metadata repository 340 can be reviewed to determine what information source clients contain the file to be blocked. Alternatively, the content signatures within content repository 1420 can include an identifier for each of the information source clients that contain the file having the particular content signature. A determination of where copies of the file to be blocked can then be made simply by reviewing the content signatures contained within content repository 1420.

In step 2160, a block instruction is sent to all information source clients which have been determined to contain the file to be deleted. For example, indexed archive system 1500 transmits a block instruction to each of information source agents 120. Transmitting a blocking instruction can include transmitting a block instruction that moves the file to be blocked, that deletes the file to be blocked, that replaces the file to be blocked with another file or that changes file system permissions to block access to the file to be blocked. Information source agents 120 will then proceed to block the file from being accessed by the information source client that it is associated with. In step 2170, method 2100 ends.

In an alternative approach to method 2100, the content signature of the file to be blocked can be transmitted to every information source agent within a network. Application registry 1620 within an information source agent can maintain a repository that lists content signatures for files that are to be blocked. Application module 1620 can include a block file application or macro that checks the content signature of each file that is attempted to be accessed or used against the list of blocked content signatures in the repository of blocked file content signatures. If a content signature exists in the registry, then the application will be blocked. Notification to indexed archive system 1500 can be provided whenever an attempt is made to access a blocked file.

Methods for Confidential Document Control Using File Identicality

The present invention also enables methods for confidential document control. A confidential/secret document registry of content signatures for known confidential/secret documents can be established. In one example, a third party or government agency can maintain a registry for intellectual property. In this case, when a patent application is filed, a content signature for the application can be registered within the registry. Every customer of the registry would send into the registry all of its new content signatures on a regular basis, for example, daily. If one of the new content signatures matches a registered content signature, then a notice is sent to both the "offender" and the registered holder. The "offender" can remove the document, thus avoiding potential lawsuits, and the owner will know that a document has leaked.

This concept can be extended to a registry for SRD (Secret/Restricted Data) for government contractors & others. The process would be similar to the confidential document registry. In this scenario, all government contractors could be required to send content signatures for their files and documents, by classification (e.g., top secret, restricted, etc), to a classified document registry. If any content signatures represent unauthorized material that a contractor should not have access to, the government could take action to track down the source of the problem. As contractors gain access to material, it would be registered for them by their contracting authority.

Figure 22:
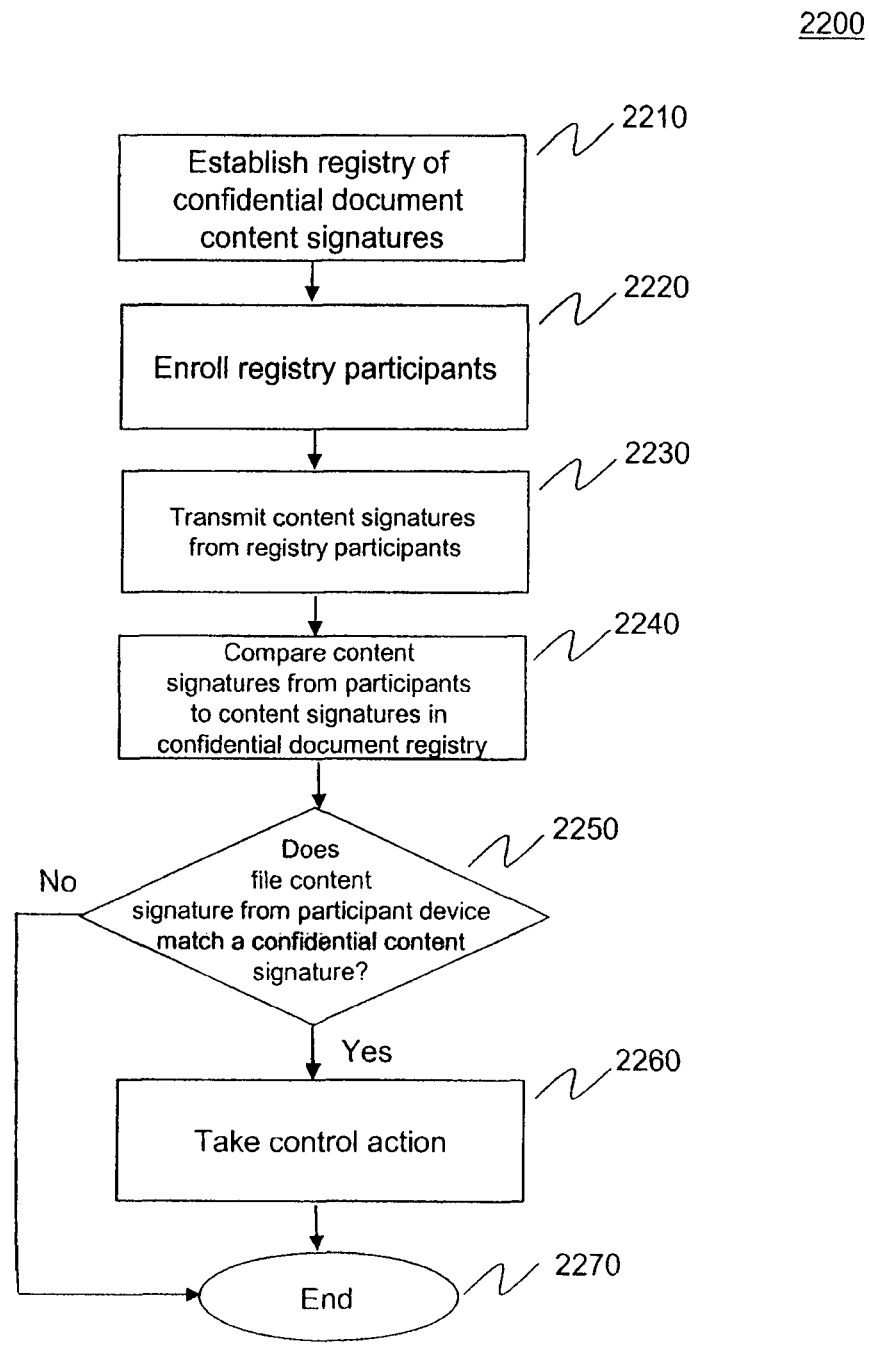
FIG. 22 is a flowchart of a method for confidential or classified document control using file identicality, according to an embodiment of the invention.

FIG. 22 provides a flowchart of method 2200 for confidential or classified document control using file identicality, according to an embodiment of the invention. Method 2200 begins in step 2210. In step 2210, a registry of confidential or classified documents is established. For example, a confidential document content signature can be established within indexed archive system 1600 within application registries 1520.

In step 2220 registry participants are enrolled. Enrollment can take on many forms. For example, within a controlled corporate network information source clients can automatically be enrolled. Access rights can be determined by department, job title, job description, organizational chart, physical location, clearance level or a combination of any of the above. When enrolling information source clients different levels of access can be provided to each information source client. For example, within a government defense contractor certain information source clients can be provided access to top secret documents, while others may be denied access. When the registry is established to support multiple entities, for example, government contractors seeking to do business with a particular government agency, the agency can require contractors to register each of their information source clients and provide communications via the Internet or a secured private network to an indexed archive system, such as indexed archive system 1500, which contains a confidential document registry.

In step 2230 content signatures from registry participants are transmitted to an indexed archive system. For example, contractor information source clients can transfer content signatures to indexed archive system 1500. During initial registration of an entity to the registry, all content signatures from the information source clients from the entity are transmitted. On an ongoing basis only new content signatures from the entity will need to be sent.

In step 2240 the content signatures for a registry participant are compared to content signatures that reside in the confidential document registry. For example, content signature comparator 1440 can compare the received content signatures against those identified in the confidential document registry.

In step 2250 a determination is made whether the content signature from a registry participant matches any stored content signature in the confidential document registry. For example, content signature comparator 1440 determines whether the received file content signature matches any of the content signatures stored in a confidential document registry If a match does not exist, method 2200 proceeds to step 2270. In step 2270, method 2200 ends.

If a match does exist, method 2200 proceeds to step 2260. In step 2260, a control action is initiated. For example, indexed archive system 1500 can send an a violation report to a party responsible for confidential document control. Additionally, as per method 2100 above, indexed archive system 1500 can transmit a block request to the information source client where the document was found to prevent further access to the confidential document. Similarly, a control action can be implemented based on method 2000 above. In step 2270, method 2200 ends.

Methods to Monitor Computer Usage and File Usage Using File Identicality

Statistical analysis of the distribution and use of files within a network can provide valuable information. For example, knowing that a particular document is on more than half of the computers in an enterprise can be very interesting. Potentially, even more interesting is knowing which of those documents have been read recently. Conceivably, if they are read often and recently they are likely a very relevant document. Additionally, computers that share operating systems and job function (e.g., twenty computers located in the Human Resource Dept.) should have very similar content files. If they do not, this may be an indication that there are inappropriate files, such as music files or pornographic pictures, on outlier machines that have different file distribution and usage characteristics compared to other computers within the group.

Figure 23:
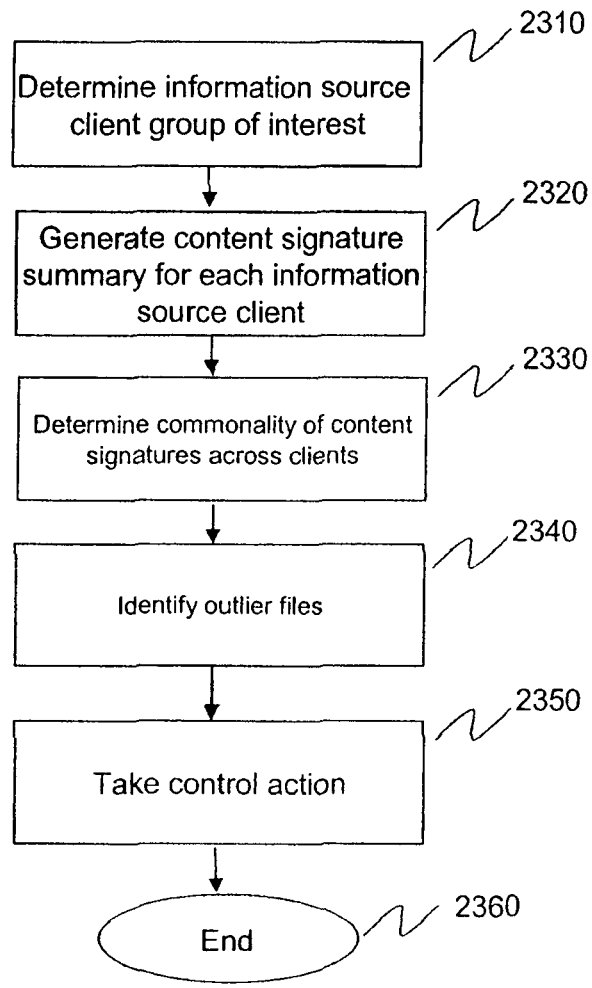
FIG. 23 is a flowchart of a method for identifying information source clients that have unique file distribution characteristics, according to an embodiment of the invention.

FIG. 23 provides a flowchart of method 2300 for identifying information source clients that have unique file distribution characteristics, according to an embodiment of the invention. Method 2300 begins in step 2310. In step 2310 an information source client group of interest is determined. For example, the group of interest might include all computers within the Human Resources Department.

In step 2320 a content signature summary for each information source client is determined. In one embodiment, a client characterization application can be loaded into application module 1510. The client characterization application can then retrieve all content signatures from content repository 1420 for each information source client within the group of interest to generate a summary of the content signatures for each information source client.

In step 2330 commonality of content signatures across information source clients is determined. For example, for each content signature a count of how many information source clients that the content signature is associated with can be derived.

In step 2340 outlier files are identified. In one embodiment, any files that appear on fewer than a set threshold of information source clients can be determined to be outlier files. Once outlier files are determined, the outlier files can be analyzed. Alternatively, a determination can be made whether an information source client is an outlier device. One test to identify an outlier device can be based on the total number of outlier files on a particular information source client. That is, if the total number of outlier files exceeds a particular threshold, then the information source client is determined to be an outlier device.

In step 2350 a control action is taken. For example, further investigation can be done of outlier devices and files, outlier files can be blocked from future access, an outlier report can be generated. In step 2360 method 2300 ends.

Figure 24:
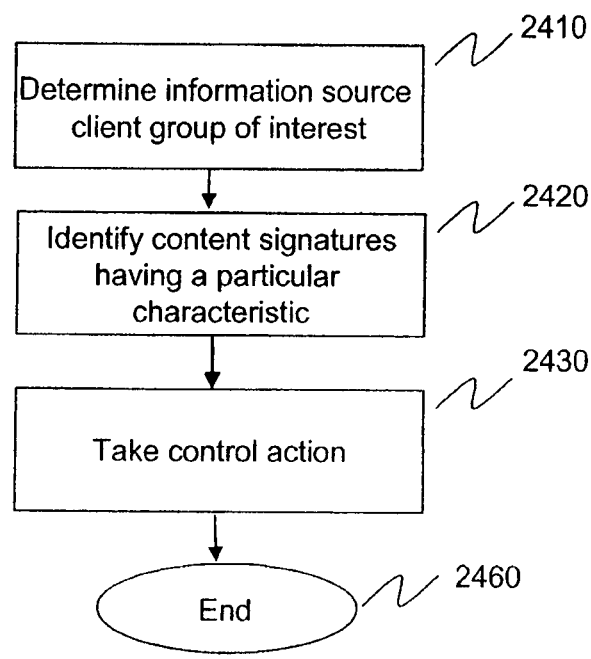
FIG. 24 provides a flowchart of a method for taking control actions based on storage or usage characteristics of files based on file identicality, according to an embodiment of the invention.

In another aspect of the invention, control actions can be taken based on storage or usage characteristics of files. FIG. 24 provides a flowchart of a method 2400 for taking control actions based on storage or usage characteristics of files based on file identicality, according to an embodiment of the invention. Method 2400 begins in step 2410. In step 2410 an information source client group of interest is determined. The group of interest can be a department, the whole organization or any collection of information source clients that may provide insights into the organization.

In step 2420 content signatures for files associated with the interest group are analyzed to identify any particular characteristics. For example, the content signatures can be analyzed to determine what documents are used most frequently, what files are most common, what files were used most recently, what files were stored most recently, etc.

In step 2430 a control action is taken. For example, usage reports can be generated. In step 2440, method 2400 ends.

File identicality can also be tied to voting by keeping counts on reading, copying, deleting, etc of files. These counts can be used to prioritize search results. For example, if a document turns up in a search, and there are 50 copies, and 45 of those copies have been read multiple times and few copies have been deleted, then this can be determined to be a "relevant" document, especially as compared to a document that had 50 copies, 45 of which were deleted without being read.

Figure 25:
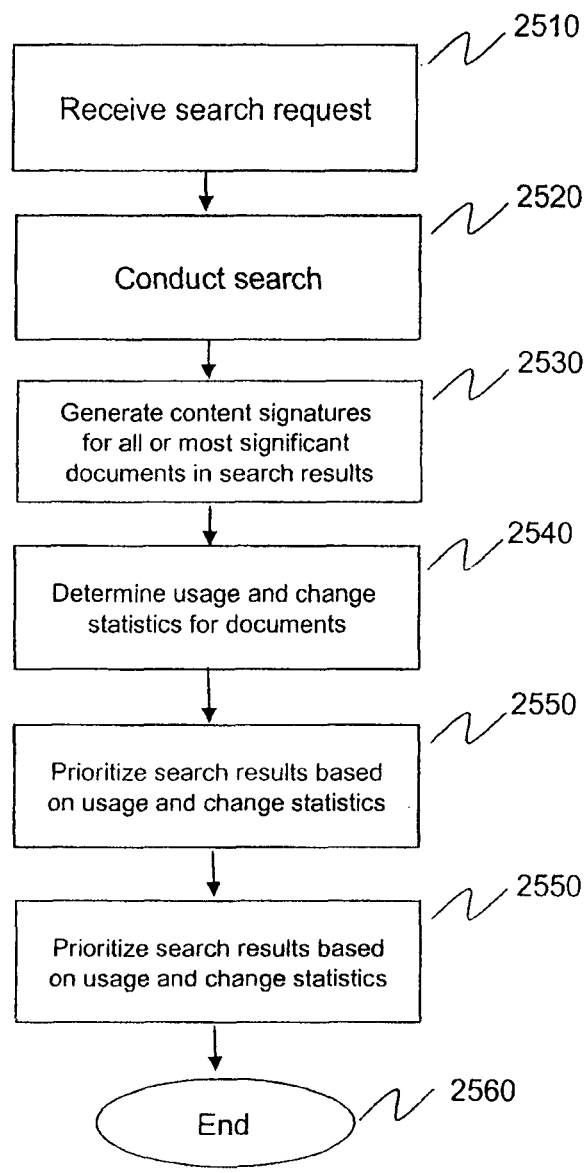
FIG. 25 is a flowchart of a method for generating search results using file identicality, according to an embodiment of the invention.

FIG. 25 provides a flowchart of method 2500 for generating search results using file identicality, according to an embodiment of the invention. Method 2500 begins in step 2510. In step 2510, a search request is received. For example, a search application may reside within applications module 1510. A user can enter a search term request that is transmitted to indexed archive system 110 where the search application resides. In step 2520, a search is conducted of all files stored in indexed archive system 110. The search can be conducted using any of the many known searching algorithms. e.g., using a search engine such as GOOGLE's, MSN's, or YAHOO's search engines. The search will generate a list of files for which the search terms were found.

In step 2530 content signatures are determined for the all or a subset of the documents identified in step 2520. Content signatures can be identified from content repository 1420, for example.

In step 2540 usage and change statistics are determined for the documents associated with the content signatures that were found in step 2520. Example usage statistics can include the number of copies of the documents found, number of recent deletions of the documents found, number of recent changes, level of usage, etc. These statistics can be determined by accessing metadata within metadata repository 340 associated with each of the instances of the documents corresponding to the content signatures.

In step 2550 the search results are prioritized based on usage and change statistics. For example, the relevancy of documents can be determined by examining the ratio of number of copies to recent deletions, the average time since last change to documents, the number of documents, and/or a combination of these measures. A prioritized list of search results can then be displayed for the search user. Based on the teachings herein, individuals skilled in the relevant arts will determine other statistical measures that can be used. In step 2560, method 2500 ends.

Using content signatures to facilitate searching provides the potential for many new applications. For example, a standard Internet search engine (e.g., GOOGLE) could make file signatures a searchable field. If this was the case, a user could effectively ask "which web sites have a copy of my copyrighted picture or story" by searching for a particular content signature.

Methods to Perform Computer Forensics Using File Identicality

File identicality knowledge is also invaluable for computer forensics. For example, if a key document was leaked to the press, instances of that document on information search clients can be tracked based on matching content signatures. Furthermore, if a backup server, such as one associated with indexed archive system 1500, is configured to maintain content deletion, once a computer has had a copy of a file, then it is even possible to track down someone who had a copy of the file and subsequently deleted it.

Figure 26:
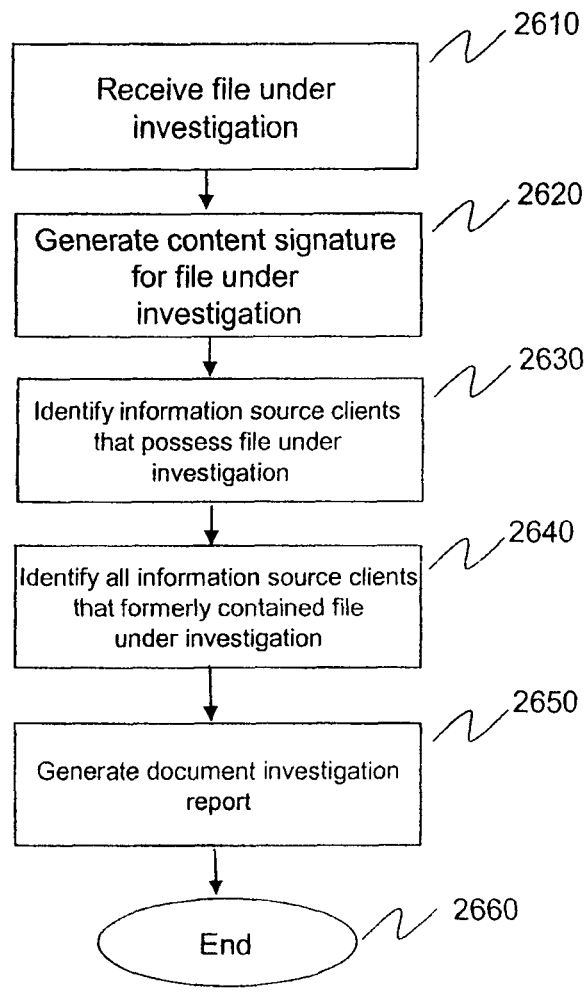
FIG. 26 is a flowchart for a method for conducting computer forensics using file identicality, according to an embodiment of the invention.

FIG. 26 provides a flowchart for a method 2600 for conducting computer forensics using file identicality, according to an embodiment of the invention. Method 2600 begins in step 2610. In step 2610 a file under investigation is received. Alternatively, a content signature can be received or generated for a file under investigation. A file includes, but is not limited to a data file, application file, system file and/or programmable ROM file. For example, indexed archive system 1500 can receive a file that was leaked to the press or a confidential document that was inappropriately released.

In step 2620 a content signature is generated for the received file. For example, content signature generator 1430 can generate a content signature for the received file under investigation.

In step 2630 information source clients that possess the file under investigation are determined. For example, indexed archive system 1500 can identify whether any content signatures in content repository 1420 match the content signature for the file being investigated. If a match exists, then all information source clients associated with the content signature are identified.

In step 2640 information source clients that formerly contained the file under investigation are identified. For example, metadata contained within metadata repository 340 associated with instances of the content signature of the file under investigation can identify information source clients that formerally contained the document having the content signature under investigation.

In step 2650 a document investigation report is generated. The report identifies the information source clients having the document with a content signature that matches the document under investigation and/or identifies the information source clients that formerly had the document with a content signature that matches the document under investigation. In step 2660, method 2600 ends.

Another aspect of the present invention uses file identicality to find systems that have installed specific devices, such as CD writer or USB disk. When these devices get installed on a system, known content signature files get copied into certain directories. These can be monitored to see who has the capability to take information out of the facility.

Further, an indexed archive system can maintain a signature watch list and notify someone if a proscribed document ever reappears in the organization. Since the backup system knows file creation and access times for each instance of every file, this knowledge can narrow the suspect instances.

Figure 27:
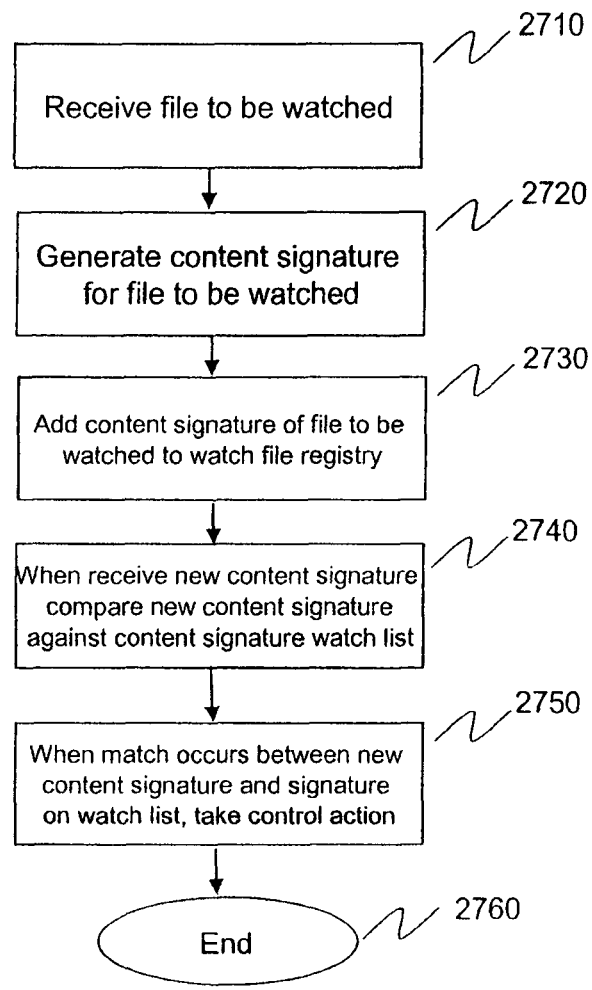
FIG. 27 is a flowchart of a method for watching the use of files based on file identicality, according to an embodiment of the invention.

FIG. 27 provides a flowchart of method 2700 for watching the use or presence of files based on file identicality, according to an embodiment of the invention. Method 2700 begins in step 2710. In step 2710 a file to be watched is received. Alternatively, a content signature can be received or generated for a file to be watched. For example, indexed archive system 110 can receive a file that was transmitted from a company administrator with a request that the file be watched. The content signatures to be watched can be for files that individuals are not permitted to have, for virus/worm/malware files, for files that require software licenses, for software files associated with stolen or missing computers, and for files related to illegal activity, such a as nuclear weapon design, child pornography or cryptographic software that cannot be imported into the United States. In step 2720 a content signature is generated for the received file to be watched. For example, content signature generator 1420 can generate a content signature for the received file to be watched.

In step 2730 the content signature for the received file to be watched is added to a watch file content signature registry within indexed archive system 1500, for example. The watch file content signature registry can be located within application registries 1520.

In step 2740 when a new content signature is received or generated it is compared against the content signatures within the content signature watch registry. In step 2750 when a match occurs between a new content signature and a content signature on the watch list, a control action takes place. For example, a notification can be sent to an administrator identifying the appearance of the file to be watched. In step 2760 method 2700 ends.

Methods to Manage File Updates Using File Identicality

In another aspect of the invention file identicality can be used to manage file updates. In embodiments, the present invention notifies users within a network that an old version of a file is obsolete, advises a local file system to notify a user when they try to open an old version of a file. In the latter scenario, this requires cooperation from the local file system. If a local file system is keeping content signatures for files, then they can be checked for currency with the server.

This approach improves on the way web page caching works today. When a web page is viewed (copied from a remote system and displayed), a local copy of the page is put in a cache (e.g., a local directory). When the page is visited again, the local copy of the page is used if it is "recent"—e.g., fetched today or in the past hour, and if older, then the cached copy is checked against the remote copy to see if it has changed. This is currently done by modification date, time and duration since the last change. The use of content signatures improves upon this approach.

Figure 28:
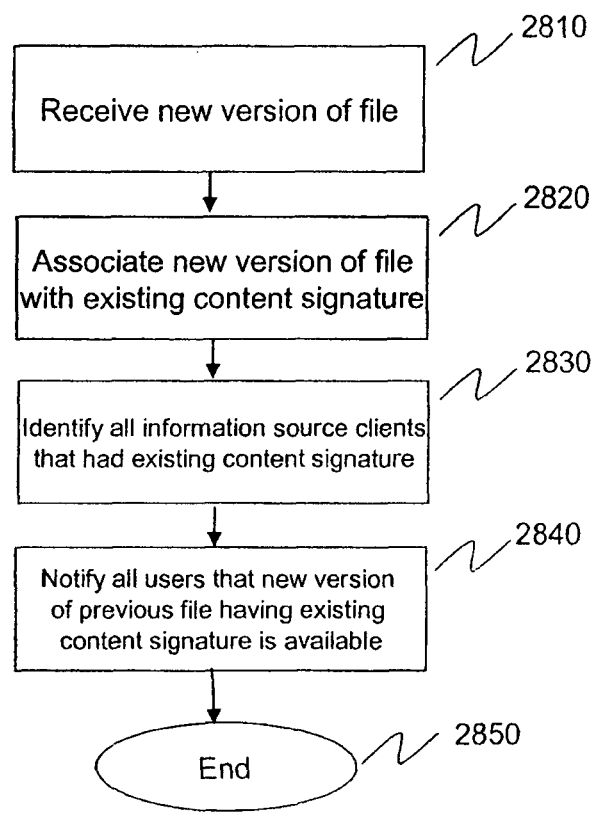
FIG. 28 is a flowchart of a method for notifying users that file updates have occurred using file identicality, according to an embodiment of the invention.

FIG. 28 provides a flowchart of method 2800 for notifying users that file updates have occurred using file identicality, according to an embodiment of the invention. Method 2800 begins in step 2810. In step 2810 a new version of a file is received. In step 2820 the new version of the file is associated with an existing content signature. For example, a file update application can reside in application module 1510 of indexed archive system that provides this association by reviewing metadata contained within metadata repository 340.

In step 2830 all information source clients that have the file associated with the content signature identified in step 2820 are identified. In an embodiment, the information source clients can be identified by reviewing the information contained within content repository 1420.

In step 2840 all users of the old version of the file are notified that a new file exists. For example, indexed archive system 1500 can send a notify message to all information source agents that cause to be displayed a message that the file has been updated. Alternatively, a notify message can be sent to all information source agents from indexed archive system 1500, such that the next time a user opens the file that has been updated, the information source agent identifies that the file has been updated. Alternatively, or in addition, file owners can be notified via an email, phone call or instant messaging that a file update has occurred. In another embodiment an information source agent notifies the owner of the update upon the next time the file is opened. In step 2850 method 2800 ends.

Methods of Accelerating Web Browsing Using File Identicality

As indicated above, in another aspect of the present invention, the use of content signatures simplifies and accelerates web browsing. When a web page is fetched, one can receive a set of content signatures representing the page and the embedded links. The browser would only have to fetch those links that did not match cached signatures. Content signatures are smaller than urls and timestamps, thus the use of content signatures would be more efficient that the current methods of updating web pages within browsers. This process is illustrated in FIG. 29.

Figure 29:
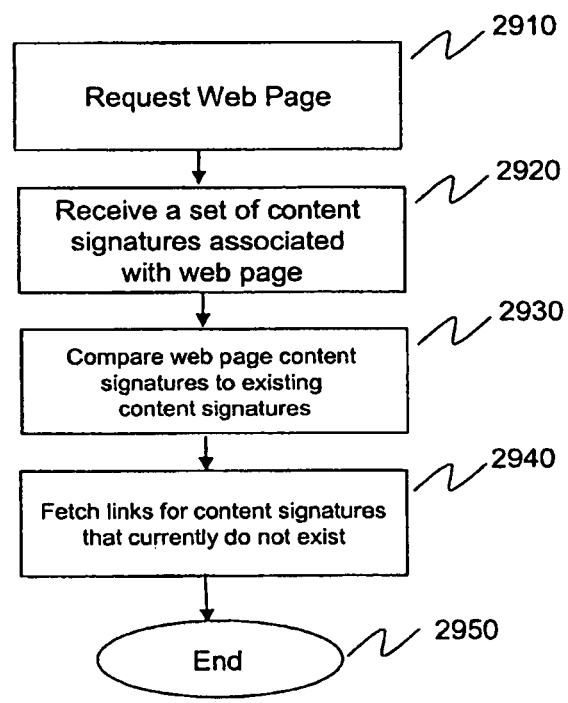
FIG. 29 is a flowchart of a method for fetching links associated with a requested web page, according to an embodiment of the invention.

FIG. 29 provides a flowchart of a method 2900 for fetching links associated with a requested page, according to an embodiment of the invention. Method 2900 begins in step 2910. In step 2910 a web page is requested. In step 2920 a set of content signatures associated with the web page are received by the user. In step 2930 the content signatures associated with the web page that are received are compared to existing content signatures located on the information source client of the user. In step 2940 links are fetched for content associated with content signatures that currently do not exist on the information source client of the user. In step 2950, method 2900 ends.

Methods for Global Content Management Using File Identicality

Once a data management system is in place, such as indexed archive system 1500 that generates and stores unique file identifiers, such as content signatures generated and stored through methods like method 1700 and 1800, file identicality knowledge enable a variety of global content management operations.

When multiple users work on common sets of documents (e.g., source files, web pages, etc.), the metadata stored within indexed archive system 1500 can be used for a variety of tracking and management functions. For example, the system can track every file's migration from system to system, who modified each file, and who is using which versions of each file. Combined with indexing, this function can replace explicit content management systems, such as Imanage.

An individual or group within an organization working in some topic area can find other individuals or groups with similar interests by looking for copies or access to common files. This could also be automated by the system by sending out notifications when common usage occurs.

File identicality normally occurs because a single file has been copied from location to location. It is also possible, however, for file identicality to occur through independent acts of creation. For all but the smallest acts of file creation, this is incredibly rare. Because it is so rare, it can provide interesting results. Simultaneous creation of identical files might occur for example by two scientists creating the same new chemical compound or discovering the same gene sequence.

Figure 30:
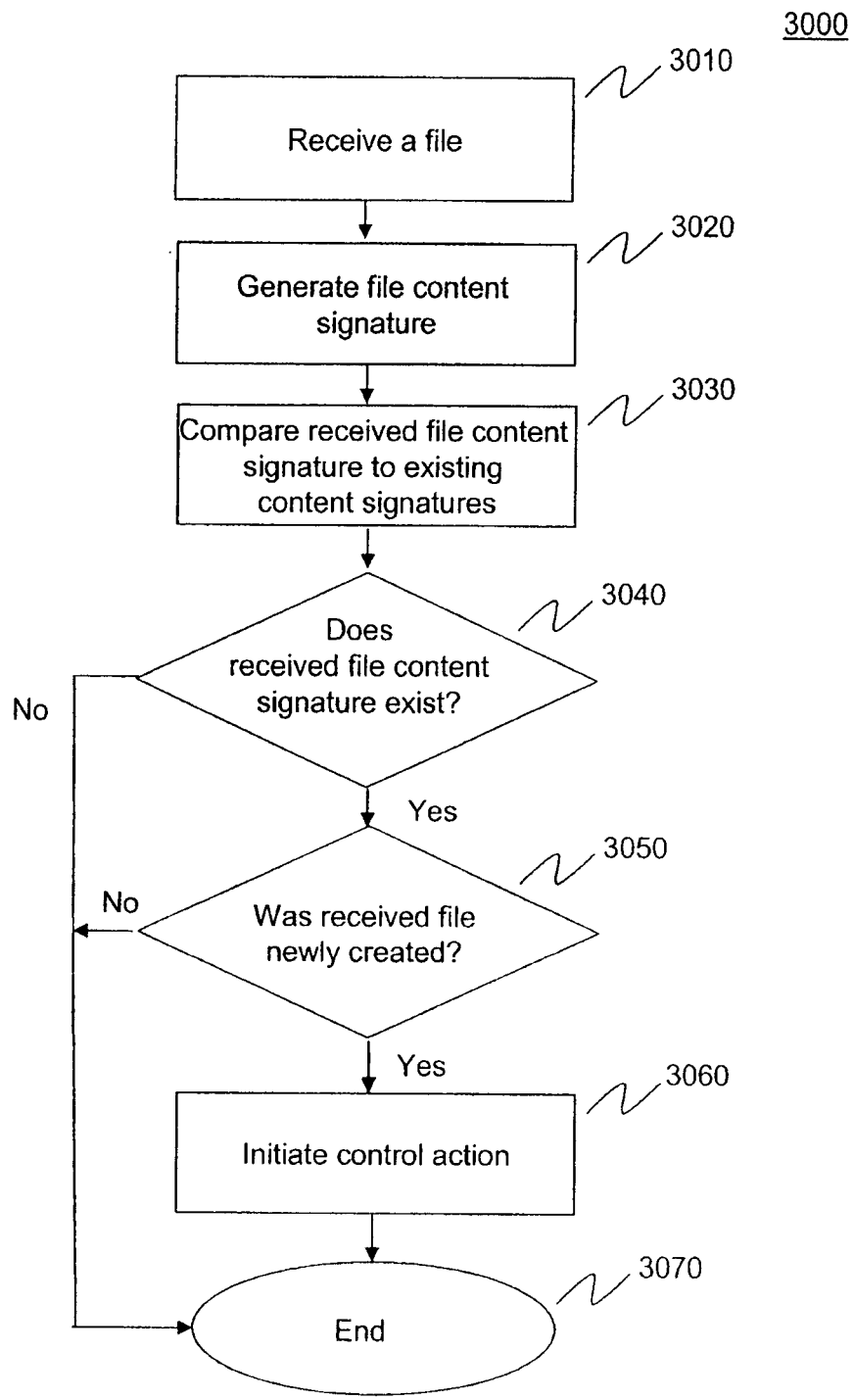
FIG. 30 is a flowchart of a method for identifying when identical files are independently created, according to an embodiment of the invention.

FIG. 30 provides a flowchart of method 3000 for identifying when identical files are independently created, according to an embodiment of the invention. Method 3000 begins in step 3010. In step 3010 a file is received. For example, indexed archive system 1500 can receive a file that was transmitted from information source agent 120. Alternatively, information source agent 1600 can receive a file. In step 3020 a content signature is generated for the received file. For example, content signature generator 1440 can generate a content signature for the received file.

In step 3030 the content signature for the received file is compared to the content signatures for existing files. For example, content signature comparator 1440 compares the received file content signature to all content signatures for files already stored within content repository 1420.

In step 3040 a determination is made whether the received content signature matches any previously stored content signatures. For example, content signature comparator 1440 determines whether the received file content signature matches any of the content signatures stored in content repository 1420. If a match does not exist, method 3000 proceeds to step 3070 and ends. If a match does exist, method 3000 proceeds to step 3050.

In step 3050, a determination is made whether the received file has been independently created. For example, content engine 1410 can examine metadata about the received file to determine its origin and date/time of creation. If a determination is made that the received file has not been independently created, then method 3000 proceeds to step 3070 and ends. If a determination is made that the received file has been independently created, then method 3000 proceeds to step 3060.

In step 3060, a control action is initiated. For example, indexed archive system 110 may generate an exception report that identifies the metadata for each of the files with matching content signatures. These exception reports can then be used to trigger a manual review of the anomaly to determine what the cause of the rare event might be (e.g., two inventors stumbling on the same discovery simultaneously, or perhaps plagiarism, or simply reentering of a document that an individual thought had been deleted from the system.) In step 3070, method 3000 ends.

This approach to determining whether a file has been independently created is complicated. Furthermore, to find perfect signature matches, the files would need to be exact and that will be true in only a very limited number of cases. A generalization of this approach includes establishing a set of hashes of interest to a user. If anyone else in an organization has that set of hashes appear, then let the user know. This is essentially another type of registry, but could be used to find someone else in an organization that uses an individual's work, so that original user (or creator) can then identify collaboration partners.

Methods for Disaster Recovery Using File Identicality

In another aspect of the invention, an outsource disaster recover site has a content signature set that is a strict subset and known portion of the content signature set for every information source client within a network. Across multiple customers, there is massive overlap of content signatures (ie., many applications and files are the same), thus the cost to back up a particular customer is quite low, both in storage and required bandwidth, because only one copy of the content need be stored no matter how many information source clients within many different networks or customers that the content exists on.

A backup server can mirror servers or maintain a "to be mirrored" file list. As new content signatures arrive at a backup server, it can queue them for mirroring and in the background coordinate with one or more mirror servers to ensure that there is always more than one copy of each file in disparate geographies. It is not necessary that every file be mirrored on every server—only that there are at least N copies, where N would typically be between 2 and 4.

With a modified local system, a computer can keep a non-volatile cache until a backup server acknowledges backup. That is, something like a memory stick or USB drive can be used to stage a copy of files to be backed up. Once the backup server confirms receipt and permanent storage, then the file can be removed from the cache. This would allow, for example, a notebook computer to operate off the network, and then to synchronize completely once re-connected. This also eliminates the possible loss of data window if the computer crashes between the time a file is saved and it is backed up to the server.

It is also possible to keep a subset of files on a local device such as a memory stick, or USB disk. As a document is being edited, it is quite likely that a recent version will be useful to the user if they make some catastrophic editing mistake. Rather than go all the way to the backup server, recent versions of the file can be kept on local backup storage.

Methods for Virus Control Using File Identicality

The present invention also provides automatic undo of viruses—e.g. backup server runs virus scan on new content and automatically undoes the damage. As a result, there does not need to be separate virus protection on every computer, just one on the backup server. This is much more cost effective and easier to maintain, with lower bandwidth to keep the single virus definition file up to date rather than updating hundreds or thousands across individual computers.

The content for some files should never vary from their well-known permitted values. These files include system binary files, help files, application programs and read only files on traditional timesharing or well configured workstations. Whenever the content for these files varies from their well-known permitted values, this indicates that something is wrong or corrupted with the file. Thus, determining whether these types of files are corrupted is a relatively straightforward procedure. That is, in an embodiment of the invention, when a computed content signature changes for these types of file, this is indicative that the file has potentially been infected by a virus or corrupted in some other manner.

Other files, such as data files (e.g., MICROSOFT WORD or EXCEL files), are more fluid. Therefore, when there is a change to the contents, this does not necessarily mean that a problem exists. Rather changes to these types of files are the norm. As a result when a "macro virus" infects data files and the content signature changes, the fact that the content signature changes cannot in and of itself signify that the file has been infected.

In embodiments of the present invention, however, there are alternative approaches to identify when a virus is impacting files across a network supported by file management system 1400. Specifically, file management system 1400 can track when many data files are changed in a short time. In this case a time threshold and a file change threshold can be established based on, for example, the number of users and the number of total files. Whenever file management system 1400 receives a file, file management system 1400 compares the content signature of the received file to existing files to determine whether it represents a changed file. If the file is a changed file, file management system 1400 increments a count of changed files within the last time threshold. If the count of changed files is greater than the file change threshold, then a control procedure is implemented to address the possibility that a virus may have inflicted the network.

In an alternative approach, whenever file management system 1400 receives a file, file management system 1400 compares the content signature of the received file to existing files to determine whether it represents a changed file. If the file is a changed file, file management system 1400 runs a virus check on every changed file.

In either approach, when it is confirmed that a virus has infected a file, rather than trying to pull the virus out of the file, which is often difficult, file management system 1400 can revert to an earlier version of the file. Such an approach is straightforward with a system, such as file management system 1400, while impractical in existing systems.

One of the biggest problems with a virus outbreak is re-infection. Using a system like file management system 1400, files can be marked as "auto revert" as a way of implementing a "read-only" type protection in a work station environment that does not have an effective way to enforce a read only concept. When a file was marked as "auto revert," it would automatically revert back to a previous uninfected version, during a period to time designated to control a particular virus outbreak.

Methods to Determine Software Revision Level Using File Identicality

The present invention also determines the software revision level sing using file identicality. For example, every set of files for a particular revision of a common software package will be identical with the same set of files on every other computer system. Using this knowledge, a determination of what software revision level each computer is at, whether any files on a computer were damaged, or whether there is a virus loose on one of the computers can be readily determined by examining existing content signatures. Furthermore, this knowledge can be used to determine if a particular installation or upgrade failed or was only partially completed.

Computer System Implementation

Figure 31:
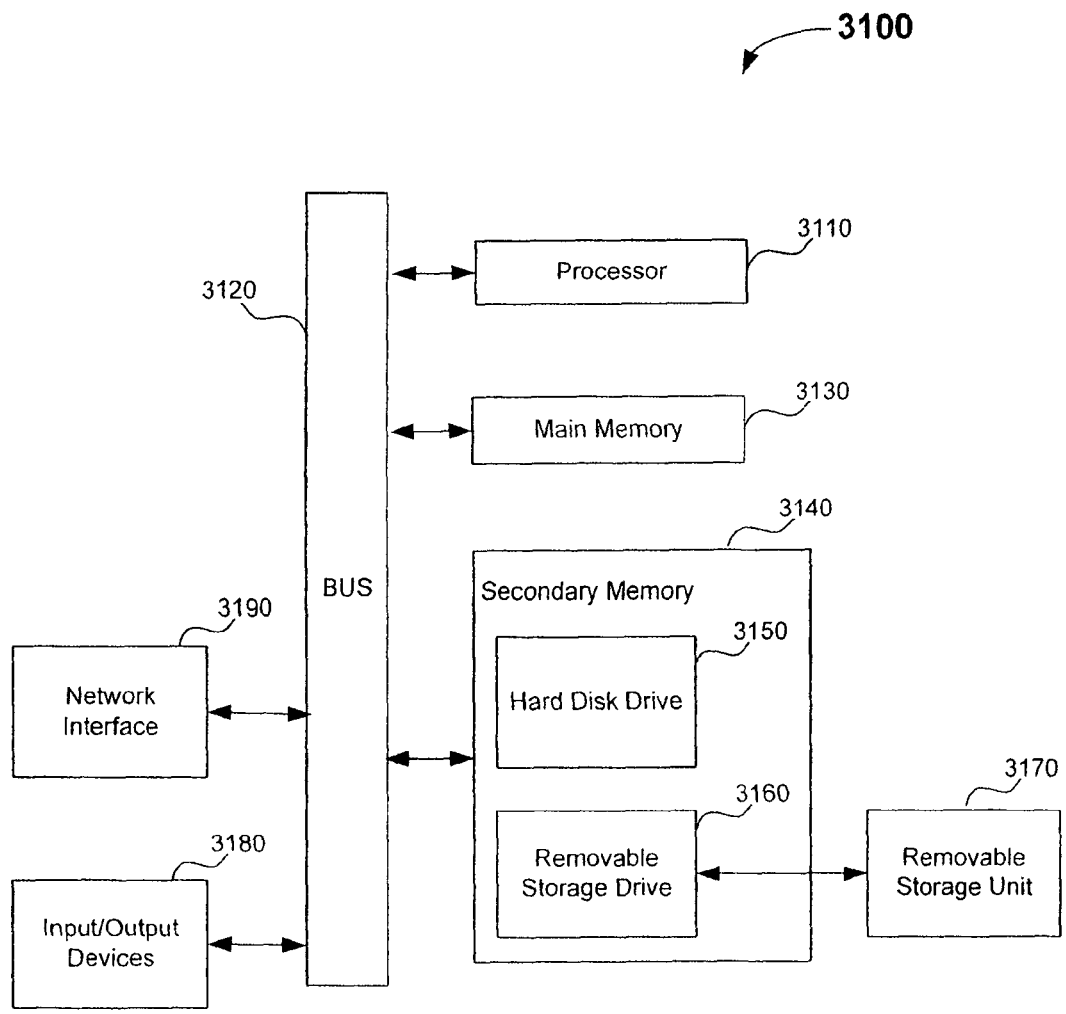
FIG. 31 is a diagram of a computer system on which the methods and systems herein described can be implemented, according to embodiments of the invention.

In an embodiment of the present invention, the methods and systems of the present invention described herein are implemented using well known computers, such as a computer 3100 shown in FIG. 31. The computer 3100 can be any commercially available and well known computer capable of performing the functions described herein, such as computers available from INTERNATIONAL BUSINESS MACHINES, APPLE, SILICON GRAPHICS, INC., SUN, HP, DELL, CRAY, etc.

Computer 3100 includes one or more processors (also called central processing units, or CPUs), such as processor 3110. Processor 3100 is connected to communication bus 3120. Computer 3100 also includes a main or primary memory 3130, preferably random access memory (RAM). Primary memory 3130 has stored therein control logic (computer software), and data.

Computer 3100 may also include one or more secondary storage devices 3140. Secondary storage devices 3140 include, for example, hard disk drive 3150 and/or removable storage device or drive 3160. Removable storage drive 3160 represents a floppy disk drive, a magnetic tape drive, a compact disk drive, an optical storage device, tape backup, ZIP drive, JAZZ drive, etc.

Removable storage drive 3160 interacts with removable storage unit 3170. As will be appreciated, removable storage unit 3160 includes a computer usable or readable storage medium having stored therein computer software (control logic) and/or data. Removable storage drive 3160 reads from and/or writes to the removable storage unit 3170 in a well known manner.

Removable storage unit 3170, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 3100, or multiple computer 3100s to perform any combination of the functions described herein.

Computer programs (also called computer control logic) are stored in main memory 3130 and/or the secondary storage devices 3140. Such computer programs, when executed, direct computer 3100 to perform the functions of the present invention as discussed herein. In particular, the computer programs, when executed, enable processor 3110 to perform the functions of the present invention. Accordingly, such computer programs represent controllers of the computer 3100.

Computer 3100 also includes input/output/display devices 3180, such as monitors, keyboards, pointing devices, etc.

Computer 3100 further includes a communication or network interface 3190. Network interface 3190 enables computer 3100 to communicate with remote devices. For example, network interface 3190 allows computer 3100 to communicate over communication networks, such as LANs, WANs, the Internet, etc. Network interface 3190 may interface with remote sites or networks via wired or wireless connections. Computer 3100 receives data and/or computer programs via network interface 3190. The electrical/magnetic signals having contained therein data and/or computer programs received or transmitted by the computer 3100 via interface 3190 also represent computer program product(s).

The invention can work with software, hardware, and operating system implementations other than those described herein. Any software, hardware, and operating system implementations suitable for performing the functions described herein can be used.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method for deleting files on one or more identified information source client computing devices across an organization, comprising:
   receiving a request for a file located internal to the organization to be deleted;
   generating a content signature for the requested file to be deleted, wherein the content signature uniquely identifies content of the requested file to be deleted;
   identifying, at a server within the organization, a stored content signature that is identical to the content signature of the file to be deleted and locations of information source client computing devices within the organization that contain files whose content signatures are identical to the stored content signature, wherein the locations are identified based on stored metadata associated with the stored content signature, and wherein the stored content signature and the stored metadata are each stored on a server within the organization;
   transmitting a delete instruction to the identified locations of the information source client computing devices within the organization, wherein the delete instruction automatically deletes the matching files residing on each of the information source client computing devices; and
   generating a deletion report comprising the information source client computing devices on which the file to be deleted was found and deletion status of the file to be deleted on the information source client computing devices.

2. The method of claim 1, wherein the delete instruction automatically deletes the file by interfacing with a remote administration tool to implement deletion, wherein the remote administration tool controls the information source client computing devices within the organization.

3. A non-transitory computer readable medium having stored thereon in digital form computer-executable instructions that, in response to execution by a computing device, cause the computing device to perform operations for deleting files on one or more identified information source client computing devices across an organization, comprising:
   receiving a request for a file located internal to the organization to be deleted;
   generating a content signature for the requested file to be deleted, wherein the content signature uniquely identifies content of the requested file to be deleted;
   identifying, at a server within the organization, a stored content signature that is identical to the content signature of the file to be deleted and locations of information source client computing devices within the organization that contain files whose content signatures are identical to the stored content signature, wherein the locations are identified based on stored metadata associated with the stored content signature, and wherein the stored content signature and the stored metadata are each stored on a server within the organization;
   transmitting a delete instruction to the identified locations of the information source client computing devices within the organization, wherein the delete instruction automatically deletes the matching files residing on each of the information source client computing devices; and generating a deletion report comprising the information source client computing devices on which the file to be deleted was found and deletion status of the file to be deleted on the information source client computing devices.

4. The non-transitory computer readable medium according to claim 3, wherein the delete instruction automatically deletes the file by interfacing with a remote administration tool to implement deletion, wherein the remote administration tool controls the information source client computing devices within the organization.

5. The method of claim 1, further comprising receiving, from each of the information source client computing devices corresponding to the identified locations, a confirmation message that copies of the file to be deleted have been deleted.

6. The non-transitory computer readable medium according to claim 3, further comprising receiving, from each of the information source client computing devices corresponding to the identified locations, a confirmation message that copies of the file to be deleted have been deleted.

7. A system, comprising:
a receiver configured to receive a request for a file located internal to the organization to be deleted;
at least one processor coupled to a memory, the at least one processor configured to:
generate a content signature for the requested file to be deleted, wherein the content signature uniquely identifies content of the requested file to be deleted; and
identify, at a server within the organization, a stored content signature that matches the content signature of the file to be deleted and locations of information source client computing devices within the organization that contain files whose content signatures are identical to the stored content signature, wherein the locations are identified based on stored metadata associated with the stored content signature, and wherein the stored content signature and the stored metadata are each stored on a server within the organization;
a transmitter configured to transmit a delete instruction to the identified locations of the information source client computing devices within the organization, wherein the delete instruction automatically deletes the matching files residing on each of the information source client computing devices; and
a report device configured to generate a deletion report comprising the information source client computing devices on which the file to be deleted was found and deletion status of the file to be deleted on the information source client computing devices.

8. The system of claim 7, wherein the receiver is further configured to receive, from each of the information source client computing devices corresponding to the identified locations, a confirmation message that copies of the file to be deleted have been deleted.

9. The system of claim 7, wherein the transmitter is further configured to interface with a remote administration tool to implement deletion of the matching files, wherein the remote administration tool controls the information source client computing devices within the organization.

* * * * *